United States Patent [19]

Wakasugi et al.

[11] Patent Number: 5,624,730
[45] Date of Patent: Apr. 29, 1997

[54] MAGNETIC HEAD

[75] Inventors: Makoto Wakasugi, Tokorozawa; Chiaki Hara, Saku, both of Japan

[73] Assignee: Citizen Watch Co., Ltd., Tokyo, Japan

[21] Appl. No.: 414,716

[22] Filed: May 17, 1995

Related U.S. Application Data

[62] Division of Ser. No. 221,389, Mar. 31, 1994, Pat. No. 5,457,871.

[30] Foreign Application Priority Data

Apr. 2, 1993 [JP] Japan ............................ 5-98404
May 20, 1993 [JP] Japan ............................ 5-139892

[51] Int. Cl.$^6$ ............................................. G11B 5/10
[52] U.S. Cl. ................... 428/136; 428/134; 428/900; 428/156; 360/103; 360/128; 360/129; 360/122
[58] Field of Search ........................ 428/134, 136, 428/900, 156; 360/103, 128, 129, 122

[56] References Cited

U.S. PATENT DOCUMENTS

| | | | |
|---|---|---|---|
| 4,636,417 | 1/1987 | Rasmussen | 428/91 |
| 4,750,071 | 6/1988 | Kato et al. | 360/129 |
| 5,148,343 | 9/1992 | Sugawara et al. | 360/122 |
| 5,151,837 | 9/1992 | Wakasugi et al. | 360/103 |

*Primary Examiner*—William Watkins
*Attorney, Agent, or Firm*—Oliff & Berridge

[57] ABSTRACT

A magnetic head is manufactured by the steps of accommodating a core chip blank into an elongated hole provided in a slider blank, joining the core chip blank and the slider blank together with glass and then grinding the surface to form a surface which makes sliding-contact with a recording medium. Glass for joining the core chip blank and the slider blank together is obtained by melting a glass rod mounted in a predetermined position on the slider blank. In order to prevent the core chip from being positionally moved by surface tension of the molten glass when the glass rod is melted, the edges of the elongated hole are partially provided with protrusions for positioning the glass rod so as to prevent surface tension of the molten glass from positionally moving the core chip.

10 Claims, 25 Drawing Sheets

MAGNETIC HEAD

This is a Division of application Ser. No. 08/221,389 filed Mar. 31, 1994 now U.S. Pat. No. 5,457,871.

BACKGROUND OF INVENTION

1. Field of the Invention

The present invention relates to a method of manufacturing a magnetic head for use in writing information into a magnetic recording medium and reading information from the magnetic recording medium. In particular, the present invention relates to a series of manufacturing steps which join a core chip blank together with a slider blank to form a magnetic head. The invention also includes a slider for use in the series of manufacturing steps and a mold for molding the slider blank.

2. Description of the Related Art

In recent years information has spread widely regarding recording/reproducing systems that use magnetic recording media. One of these systems is a floppy disk drive device that stores information into a disk-like magnetic recording medium. This disk-like magnetic recording medium is commonly referred to as a floppy disk.

Currently, typical floppy disk drives are of the 3.5-inch 135TPI (Track Per Inch) type. The magnetic heads they employ are mainly of the tunnel erase and bulk types. This practice is expected to continue into the future. The floppy disks for use in these floppy disk drives typically store two megabytes of data.

There is a trend wherein pieces of electronic equipment are becoming smaller. In order to fit inside miniaturized pieces of electronic equipment, floppy disk drive devices must also become smaller in size. Naturally this will lead to a demand for miniaturized floppy disk drive components, including the magnetic head.

Ordinarily, the magnetic head also known as a bulk-type head, comprises a ceramic slider placed in sliding-contact with the recording surface of the magnetic recording medium and a gimbal spring for supporting this slider on a carriage arm. This magnetic core accommodates a recording/reproducing coil assembly and an erasing coil assembly which are attached to the magnetic core. This magnetic core also accommodates a back core for magnetically closing the opening in the end of the magnetic core.

FIG. 1 is a schematic view of such a conventional magnetic core. FIG. 1 shows a magnetic core 104 of a type in which a core chip 101 is clamped by a first slider 102 and a second slider 103. The slider for this type of magnetic core is partitioned into two parts, and is therefore called a two-part slider. FIG. 2 depicts the magnetic core 104 shown in FIG. 1, viewed from below. In order to manufacture the magnetic core 104 of such two-part sliders, the first and second sliders 102, 103 are individually skived from a large block of ceramic with a diamond wheel. The core 101 is then clamped between the first and second sliders 102, 103 and they are all joined together. Alternative methods may include the steps of individually preparing the two sliders 102, 103 through powder compressive molding or injection molding, clamping and joining the magnetic core 101 by them, and then carrying out the finish processing. Both methods are problematic because the processing cost is high.

In the magnetic core having the two-part slider structure the core chip 101 is clamped between the first slider 102 and the second slider 103 and joined to them by adhesive or glass. The position of each of the joint surfaces may inconveniently with the result that the bottom surfaces of the two sliders 102 and 103 and core chip 101 do not lie on the same plane. That is, the core chip bottom surface 105, the first slider bottom surface 106 and the second slider bottom surface 107 shown in FIG. 2 may not coincide in the same plane but instead be uneven. FIG. 3 depicts a dispersion in distance (hereinafter referred to as CS level difference) between the plane defined by the first slider bottom surface 106 and the second slider bottom surface 107, and the core chip bottom surface 105. From FIG. 3, the width of dispersion in CS level difference is seen to be about 20 μm.

Shown in FIG. 2 is a recording/reproducing gap depth 108 (gap depth is hereinafter referred to as GD). This recording/reproducing GD and the erasing GD (not shown in FIG. 2) together determine the "good" or "poor" electromagnetic conversion characteristics. This relationship is well known. In order to confer predetermined dimensions on GD, the top surface on the sliding-contact surface side is ground. This method of grinding comprises the steps of aligning several hundreds of the cores on the GD processing plate, adhering the cores to the plate, and then processing them all at one time.

At that time, in order to process so as to reduce the dispersion in GD of a group of several hundred cores 104, which are processed as a unit, a) the distance from the bottom surface 105 of the core chip to the lower end of the gap must coincide for all the core chips, and b) the dispersion in CS level difference must be small, and c) each core must be adhered to the GD processing plate in such a manner that the adhesive has a uniform thickness.

The maximum allowable dispersion in GD dimension for magnetic heads used in floppy disk drives designed to handle two megabyte floppy disks is ±10 μm. Thus, if the dispersion in CS level difference were 20 μm in width, it would be the same as the allowable dispersion in GD dimension. For that reason, the core chip 101 must be grouped in incremental depths of 4 to 5 μm with respect to CS level difference, and the process must use abrasive suitable for each group. In other words, stratified operation on groups of cores is required.

With the aim of lowering the production cost, a magnetic core 110 having an integral slider as shown in FIG. 4 was conceived.

The slider 111 is provided with the two sliding-contact surfaces coming into sliding-contact with the floppy disk. The sliding-contact surface provided with an elongated hole 112 is a main sliding-contact surface 113, and the other sliding-contact surface is a subsidiary sliding-contact surface 114. The elongated hole 112 accommodates a core chip 115 which is adhered to the slider 111 by glass.

The magnetic core 110 shown in FIG. 4 is obtained by assembling the individual parts shown in FIG. 5. That is, the magnetic core 110 comprises a core chip blank 119 having an elongated hole 118, a core chip blank 120 to be accommodated into the elongated hole 118, and a glass rod 121 to be melted to join the slider blank 119 and the core chip blank 120 together. The slider blank 110 includes along the long sides of its elongated hole 119 a series of protrusions 122. The protrusions 122 are used to position the glass rod 121 when mounting the glass rod 121 on the core chip blank 119.

As described above, the glass rod is melted to allow the glass to enter the gap between the core chip blank 120 and the slider blank 111. The protrusions 122 stably mount the long glass rod 121 prior to melting. The protrusions 122 are slightly longer than the elongated hole 118.

FIG. 6 is a sectional view showing the A—A section when the individual parts in FIG. 5 are combined. Alphabetic Symbols designate dimensions of the ingredient components. Dimension a designates an inner dimension of the protrusions 122. Dimension b designates a distance between the long sides of the elongated hole 118 Dimension c denotes a diameter of the glass rod 121 Dimension d denotes a thickness of the core chip blank 120 Dimension e denotes a height of the protrusions 122 Dimension f signifies a step in lower surfaces, namely, a CS level difference between the core chip blank 120 and the slider blank 119.

The core chip blank 120 is higher than the core chip 115 shown in FIG. 4 by about 100 µm, and the glass rod 121 is mounted between the protrusions 122 for melting. When the glass rod 121 is mounted prior to melting the height of the mounting surface 123 on which the glass rod 121 is mounted is greater than that of the core chip blank 120 by about 100 µm. Between the core chip blank 120 an the slider blank 119 there is a clearance on the order of 20 µm so that the core chip blank 120 is correctly positioned and the core chip blank 120 can be inserted into the elongated hole 118 without influence of frictional force.

The steps of manufacturing the magnetic head having the integral slider mentioned above will now be described. The slider blank 119 is placed on an assembly jig (not shown) with its sliding part upward, and the core chip blank 120 is inserted into the elongated hole from above so as to bring its bottom surface into intimate contact with the jig surface. The glass rod 121 is mounted between the protrusions 122 and then melted in an electric furnace. The glass infiltrates and fills the gap between the core chip blank 120 and the elongated hole 118, to join the core chip blank 120 to the slider blank 119.

After joining in this manner, the protrusions 122 are ground for removal together with the glass hardened after melting to skive a sliding surface. The sliding surface is further ground to obtain a smoothly finished surface, thus obtaining a desired accuracy in the GD. The subsequent steps are not important in this case, and hence figures thereof are omitted from this discussion. The coil assembly for recording/reproducing and for erasing is inserted into the core leg of the core chip. The back core is then assembled into the end of the core leg to complete the magnetic circuit. Finally, it is adhered to the gimbal spring and connected to the coil terminals to complete the magnetic head.

In the method of manufacturing the two-part slider magnetic head according to the prior art technique described above, a stratified operation on groups of cores must be used for the GD processing due to a larger dispersion in CS level difference.

Despite the fact that in construction of the integral slider magnetic head there is an absence of frictional resistance when the core chip blank is incorporated into the slider, the dispersion in CS level difference is greater than that of the two-part slider described above. Accordingly, a stratified operation on groups of cores is required at the time of GD processing, in the same manner as in the two-part slider.

As a result, in addition to increased complexity of manufacturing operations, products belonging to the stratified individual groups must be accumulated in stock until there are enough to process as a unit, since the core located at the ends of the width of the dispersion level difference is naturally of rare occurrence.

Steps even larger than the expected width of the dispersion in CS level difference sometimes occur. Since these must be considered "poor", the yield will be lowered, thus increasing cost.

When the stratified operation for CS level difference is executed, the bottom surfaces of the core chip and the slider may be subjected to stress which may cause a flaw or cutout to occur. Regardless of whether a flaw or cutout occurs, the residual set may lower the quality. Also, the offset of the glass rod may cause the glass to deficiently infiltrate and fill the gap between the core chip blank 120 and the elongated hole 118.

Since the conventional slider shrinks 20% when the slider blank 119 is sintered, it can be readily deformed. In the erect posture with the main and subsidiary sliding-contact surfaces 124, 125 facing upward as shown in FIG. 7, for example, the shrinkage is restricted by the frictional resistance of the slider blank 119 in contact with the sintering jig 126 whereby the slider presents a trapezoidal shape as shown in FIG. 8. When the slider blank 119 is laid down on its side as shown in FIG. 9, the end walls 127 may be caved inward by the weight of the slider blank as shown in FIG. 10. In the inverted state with the main and subsidiary sliding-contact surfaces 124, 125 facing downward as shown in FIG. 11, the slider is minimally deformed. In this posture, however, the stability is poor due to the presence of the protrusions 122, and this will inevitably lead to deformation. Note that the slider blank 119 shown in FIGS. 8 and 10 is extremely deformed for convenience of explanation.

Irrespective of posture taken, deformation occurs and causes the peripheral assembly reference surfaces 128 and 129 to become wavy as shown in FIG. 12. This waviness makes it difficult to correctly position the read/write head with a precise recording/reproducing gap 130 and azimuth 131. As a result, it is also difficult to register the recording/reproducing track center 131 using the outer peripheral reference surfaces 128 and 129.

Upper and lower mating surfaces of the mold for molding the integral slider blank 119 coincide with the lower end portion 132 of the elongated hole shown in FIG. 6. Therefore, a burr produced in this region will catch when the core chip blank 120 is inserted into the elongated hole, which will result in dispersed GD dimensions. In order to remove this burr, barrel processing must be done. However, the lower end portion 132 of the elongated hole is located inside the slider blank 119, and hence media for the barrel finishing do not reach there. The provision of the butt surface within the interior of the elongated hole 118 would cause an offset at this area, which would catch the core chip blank 120 at the time of insertion thereof or prevent it from being inserted.

It is therefore the object of the present invention to solve the above problems by providing a method of manufacturing a magnetic head less dispersion in CS level difference, thus a) reducing the number of GD processing steps and b) reducing the number of parts which must be accumulated in stock to a minimum and c) shortening the processing procedure while d) simultaneously ensuring a consistently high quality and a reduced production cost.

Another object of the present invention is to provide a slider for a combined magnetic head whose blank which, when sintered, remains stable in posture and minimally deforms.

A further object of the present invention is to provide a slider for a combined magnetic head which may be accurately assembled through use of an assembly reference surface.

A still further object of the present invention is to provide a mold for molding a slider for use in a combined magnetic head in which a transverse burr can project from the upper end surface of the core slit molding part. This facilitates removal of the burr and prevents an extensive dispersion in the CS level difference.

SUMMARY OF THE INVENTION

In order to accomplish the above object, the present invention provides a method of manufacturing a magnetic head comprising the steps of inserting a core chip blank into an elongated hole provided in a slider blank, the slider blank having a plurality of protrusions discontinuously arranged on edges of two long sides of the elongated hole; mounting a glass rod with a length greater than that of the elongated hole on the upper portion of the elongated hole while using the protrusions as a guide; melting the glass rod to join the core chip to the slider; and grinding the surfaces of the slider blank and the core chip blank to a predetermined dimension to thereby remove the protrusions.

Preferably the glass rod used has a diameter substantially equal to the thickness of the core chip.

Preferably used is a slider blank whose protrusions extend from the surface on which the glass rod is mounted to a height about one-half the diameter of the glass rod.

Preferably used is a slider blank whose protrusions are provided only on the edges of both ends of the long sides of the elongated hole.

Preferably used is a slider blank whose protrusions are provided only on the edges of both the ends and the middle points of the long sides of the elongated hole.

Preferably used is a slider blank including a main sliding-contact portion having the elongated hole and a subsidiary sliding-contact portion juxtaposed with the main sliding-contact, one or two of the protrusions of the elongated hole having a predetermined height greater than that of the other protrusions, the subsidiary sliding-contact portion being provided with one or two protrusions having a height equal to that of the one or two higher protrusions of the elongated hole.

Preferably used is a slider blank with one side surface which includes two assembly reference surfaces and which intersects the surface provided with the elongated hole, and with a second side surface which includes one assembly reference surface and which intersects the first side surface.

Preferably used is a slider blank whose side surface which includes the two assembly reference surfaces is a side surface extending in the direction along the elongated hole.

Preferably used is a slider blank molded with a mold wherein the surface on which the glass rod is mounted serves as a mold butt surface.

Preferably used is a slider blank including a main sliding-contact portion having the elongated hole and including a subsidiary sliding-contact portion juxtaposed with the main sliding-contact portion and having at least one protrusion a gate surface having a height intermediate between the height of the protrusions and the height of the final ground surface, and a pin point gate corresponding to the gate surface of the mold, from which the molding material is injected.

Preferably used is a slider blank whose gate surface is higher than the height which is midway between the height of the final ground surface and the height of the protrusions.

According to another aspect of the present invention, a mold is provided for injection molding a slider blank intended for use in a magnetic head. The slider blank is accommodated into an elongated hole in a core chip blank and joined thereto with glass, and the surface is ground. The opening surface of the elongated hole acts as a mold butt surface.

According to a further aspect of the present invention, a mold is provided for injection molding a slider blank. The slider blank is intended for use in a magnetic head wherein a core chip blank is accommodated into an elongated hole in the slider blank. The core chip blank is joined to the elongated hole in the slider blank with glass, and the surface is ground. The shape of the slider blank to be molded includes a main sliding-contact portion having the elongated hole and a subsidiary sliding-contact portion juxtaposed with the main sliding-contact portion and having at least one protrusion. The shape further includes a gate surface having a height intermediate between the height of the final ground surface. The mold includes a gate surface molding part for molding the gate surface, and the gate surface molding part is provided with a pin point gate.

Preferably molded is a slider blank whose gate surface is higher than the height which is midway between the height of the protrusions and the height of the final ground surface.

According to the present invention, the amount of glass necessary is only that which is enough to fill the gap without causing any deficiency, thereby stably adhering the core chip to the slider so that the core chip will remain in position relative to the slider.

Moreover, according to the present invention, by using a plurality of protrusions having the same height to form a supporting surface when the blank is sintered, the blank's posture is stabilized and deformation is minimized due to the smaller intervals between the protrusions constituting the supporting surface.

Furthermore, according to the present invention, since the posture of the blank is stabilized and the deformation can be suppressed to a minimum by using a plurality of protrusions having the same height to form the supporting surface when the blank is sintered, the assembly reference surfaces formed on the end walls of the blank and the assembly reference surfaces formed on the lateral side walls will not become wavy. By employing these assembly reference surfaces as a reference, the position of the recording/reproduction gap on the peripheral reference and the position of the azimuth and recording/reproduction track center can be correctly found when assembling the core chip.

According to the present invention, a transverse burr can project from the upper end portion on the sliding-contact surface side of the elongated hole molding part at the time of injection molding. In this case, the height of the burr is set to be the same as or slightly higher than that of the core chip, thereby facilitating the removal of the burr. Even if a small amount of burr is left, the core chip passes through the burr without being caught by the burr, thus preventing an extensive dispersion in the CS level difference.

In the mold structure for a slider used in the combined magnetic head of the present invention, a convex remainder remaining after separating the pin point gate 75 would not reach the height of the protrusions 44, 45 and a concavity would not interfere with the finished sliding-contact surface. The remainder will never protrude and interfere when the slider blank is sintered while lying down on its side and will not appear on the finished sliding-contact surface, thus ensuring a satisfactory quality in external appearance.

DESCRIPTION OF THE PREFERRED EMBODIMENTS

Figure 1:
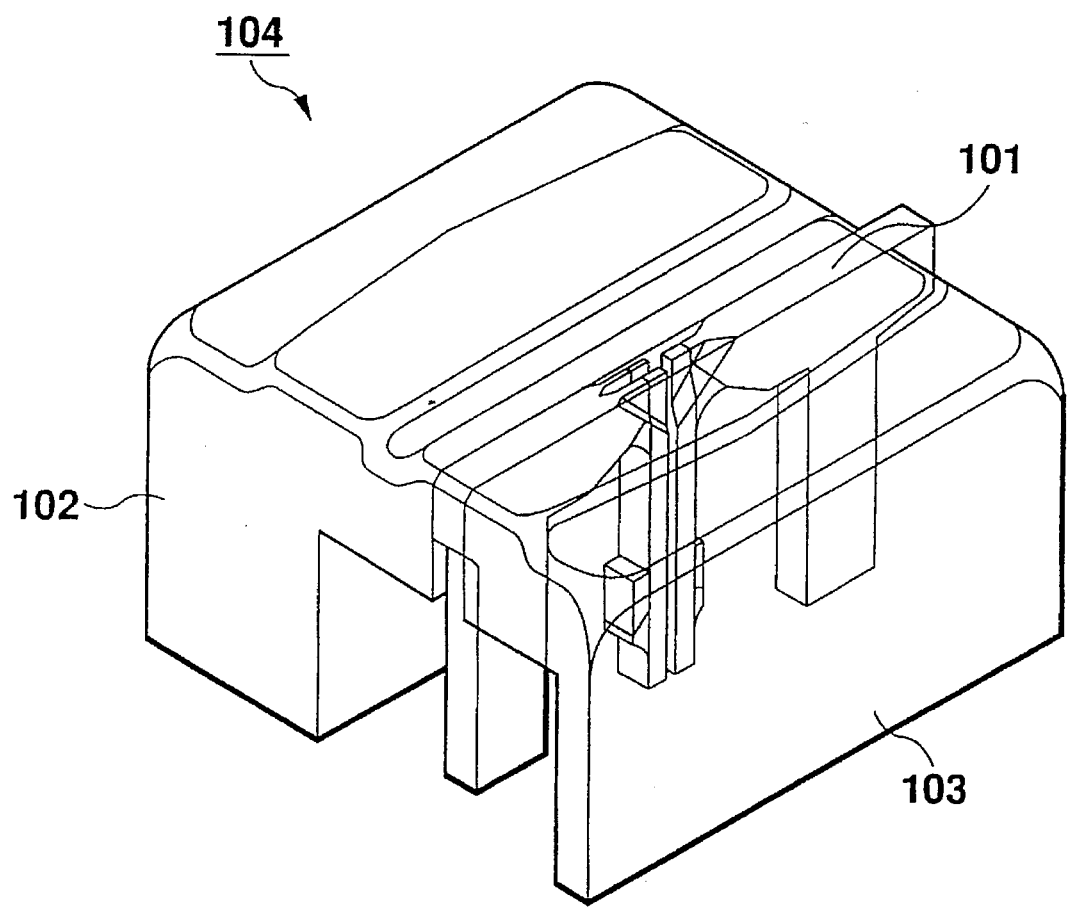
FIG. 1 is a schematic perspective view of a conventional magnetic head core, showing in particular the structure of a two-part slider.
Figure 2:
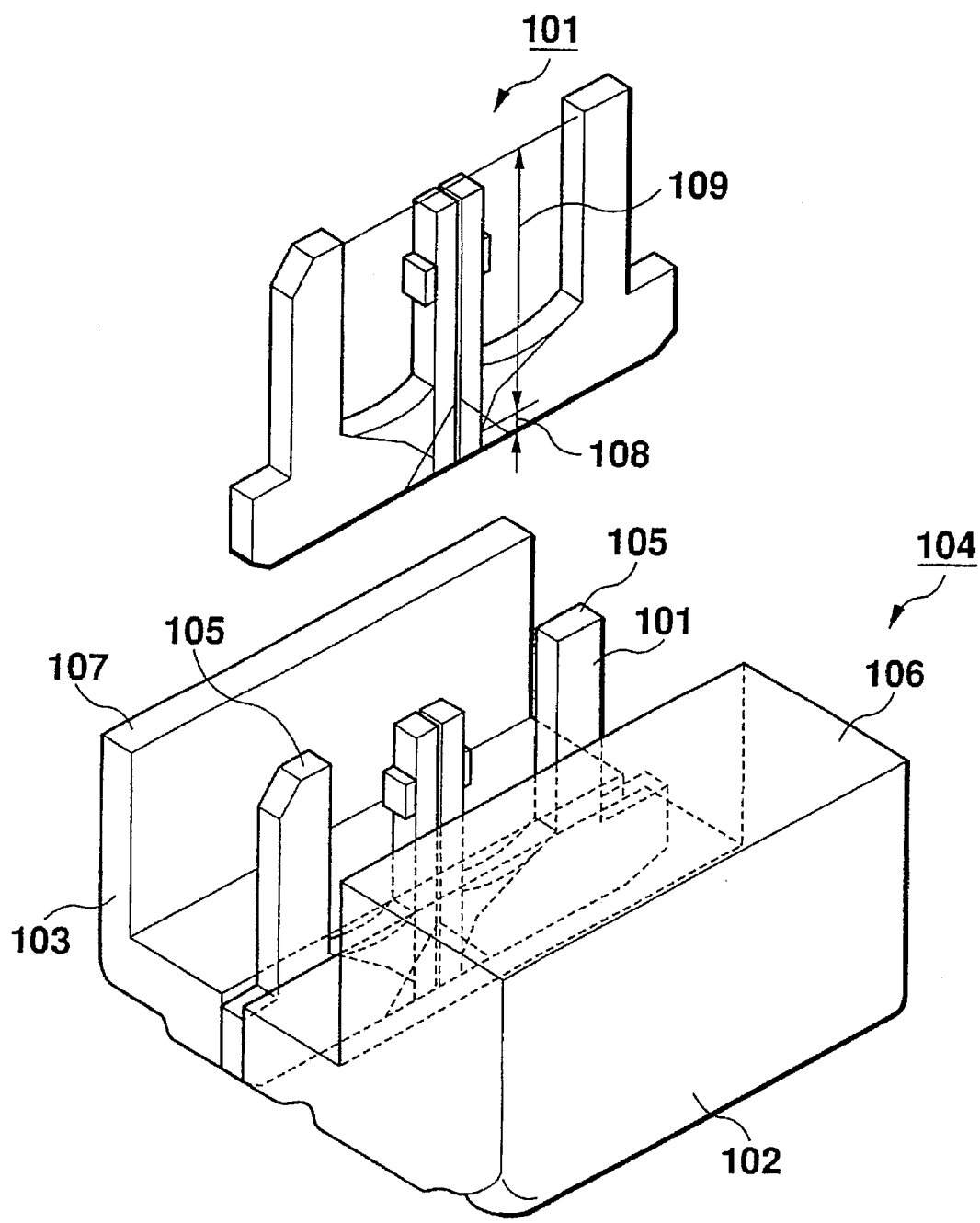
FIG. 2 is a perspective view of the magnetic head core shown in FIG. 1, viewed from the bottom surface.
Figure 3:
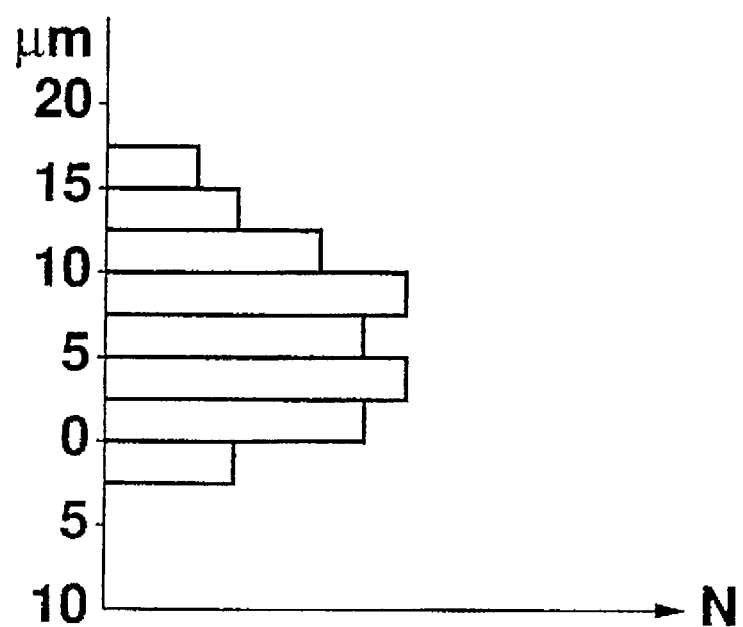
FIG. 3 is a graph showing a variate in CS level difference when preparing the magnetic head core of the type shown in FIG. 1.
Figure 4:
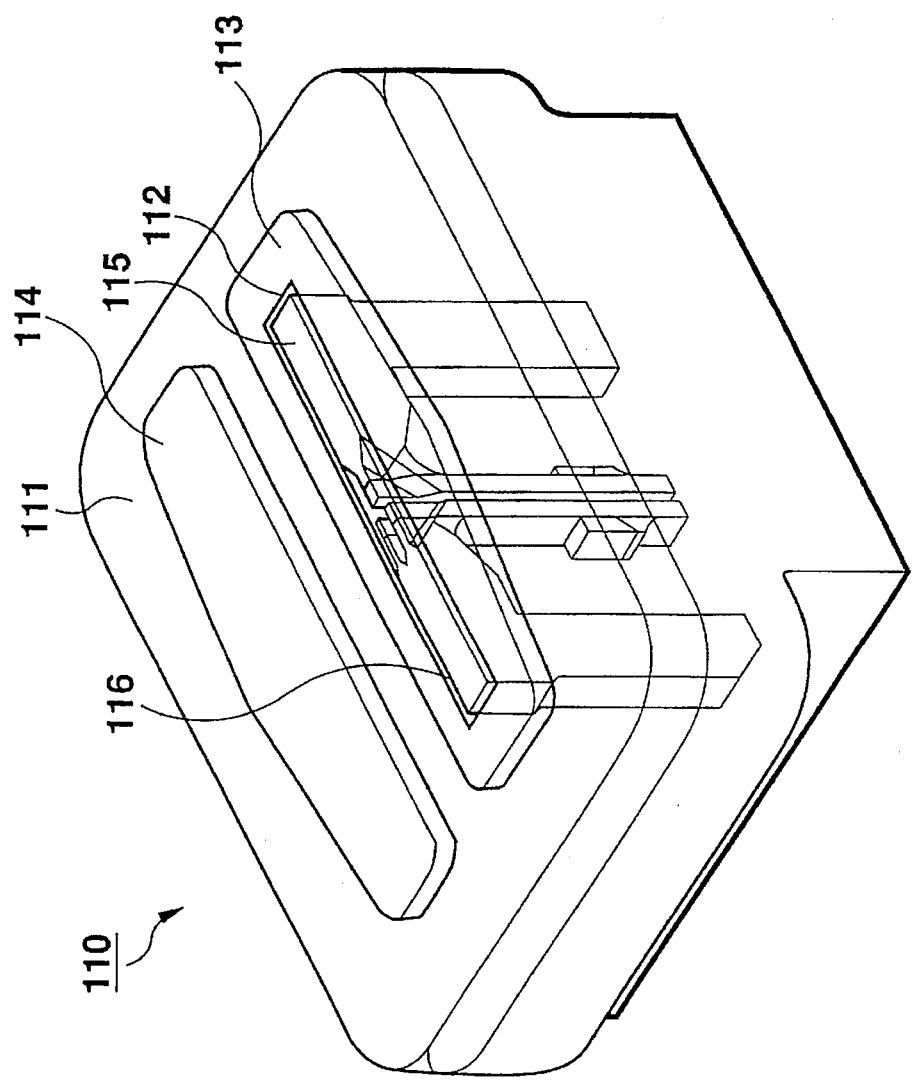
FIG. 4 is a schematic perspective view showing the conventional head core, showing in particular the structure of an integral type slider.
Figure 5:
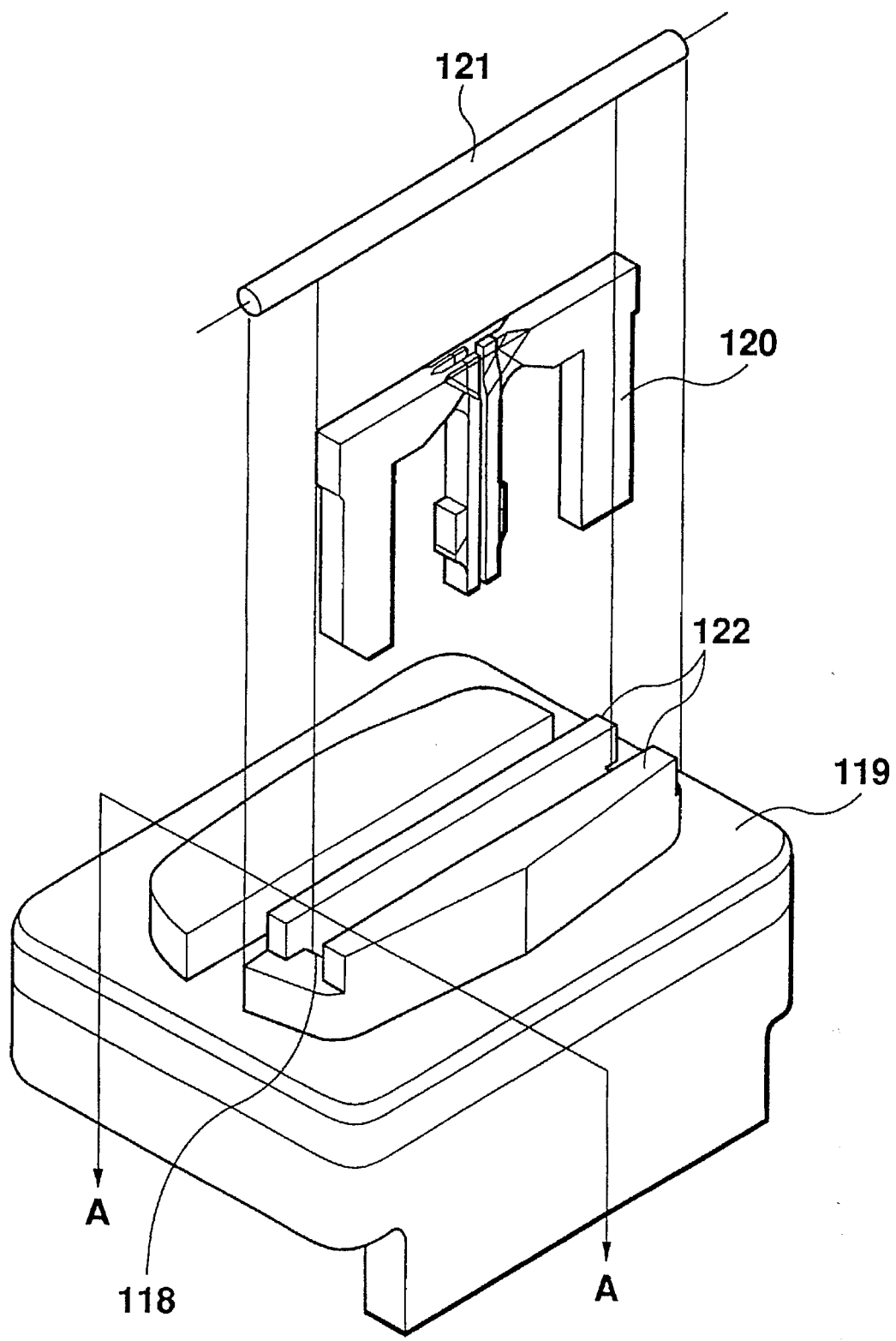
FIG. 5 is a diagram for explaining step in the assembly process for the magnetic head core shown in FIG. 4.
Figure 6:
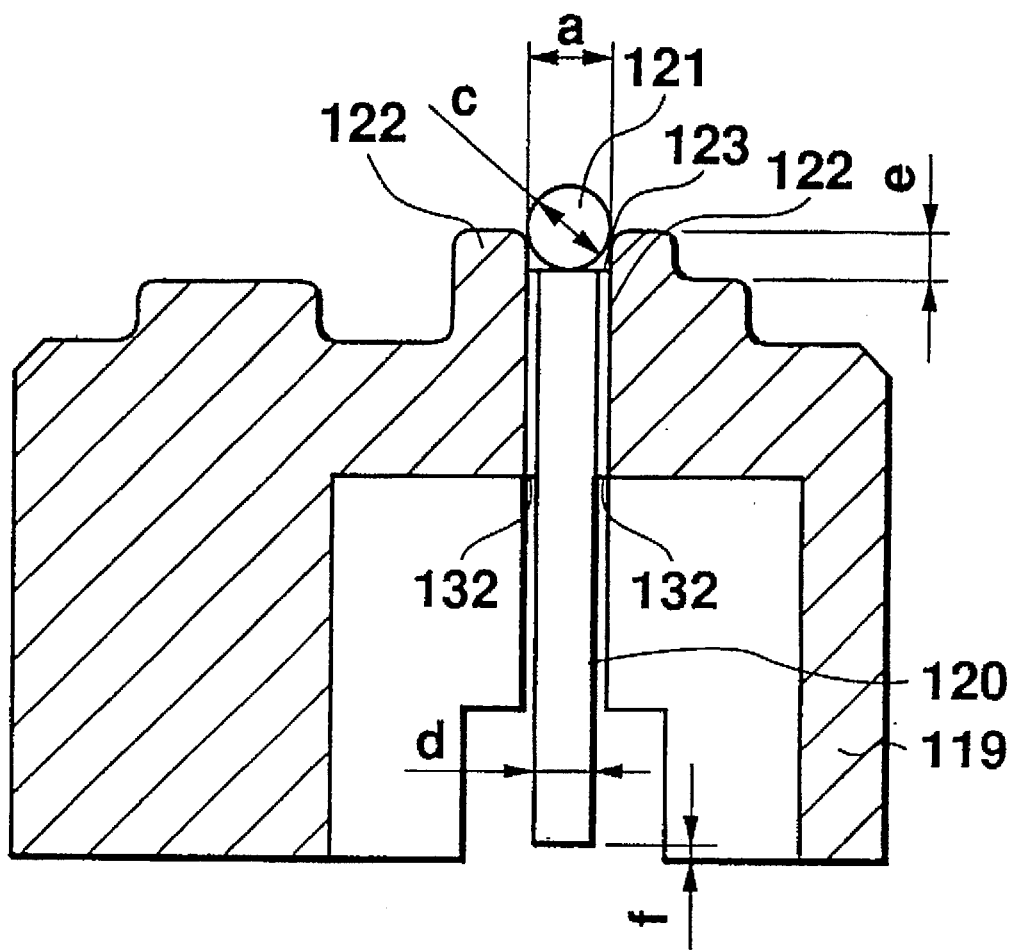
FIG. 6 is a diagram for explaining a the magnetic head core shown in FIG. 4, showing a section taken along the line A—A.
Figure 7:
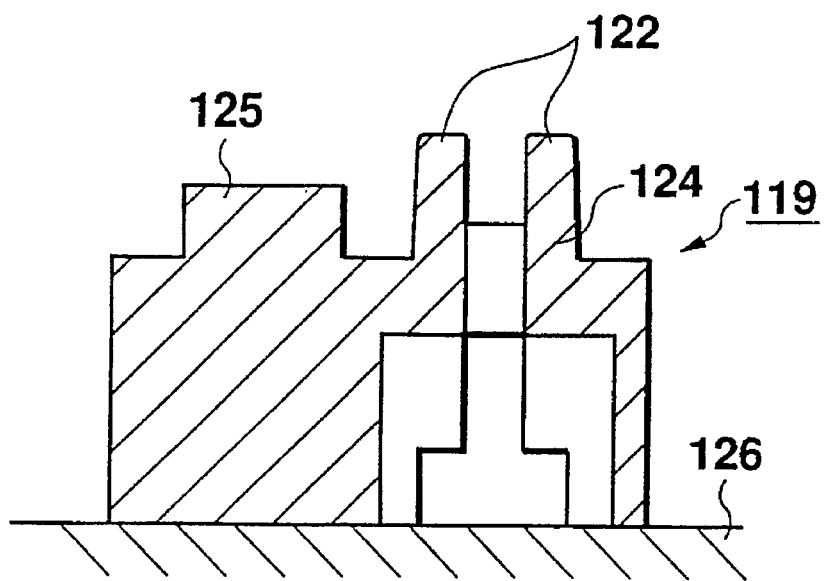
FIG. 7 is a diagram for explaining the occurrence of a strain when sintering a slider blank shown FIG. 5, particularly showing the erectly placed slider blank prior to sintering.
Figure 8:
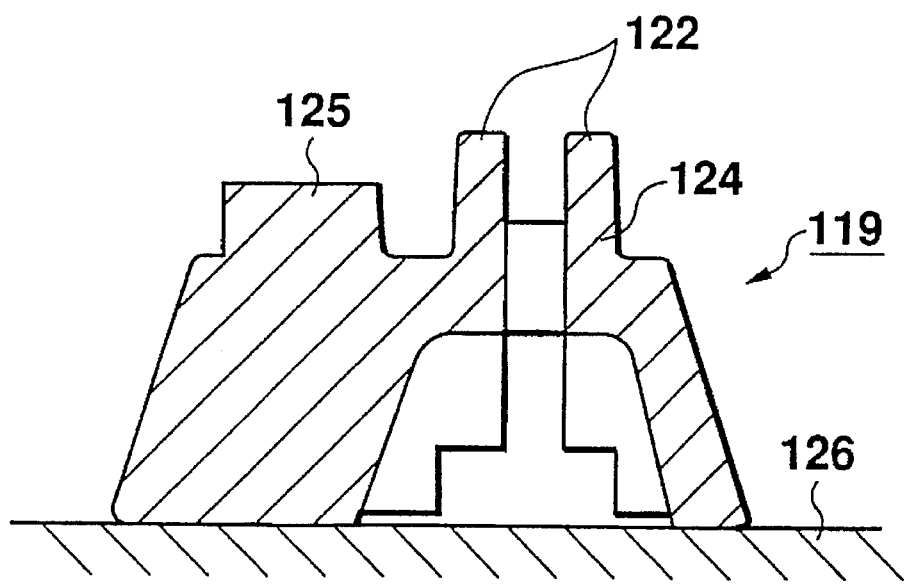
FIG. 8 is a diagram for explaining the occurrence of a strain when sintering the slider blank of FIG. 5 particularly showing the sintered shape which results when the slider blank is sintered while erectly placed as in FIG. 7.
Figure 9:
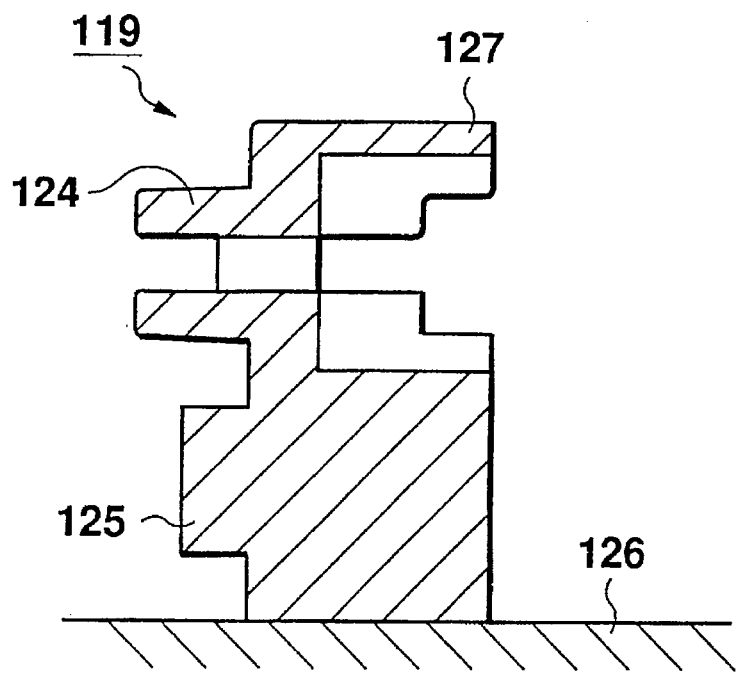
FIG. 9 is a diagram for explaining the occurrence of a strain when sintering the slider blank of FIG. 5, in particularly showing the slider blank lying on its side.
Figure 10:
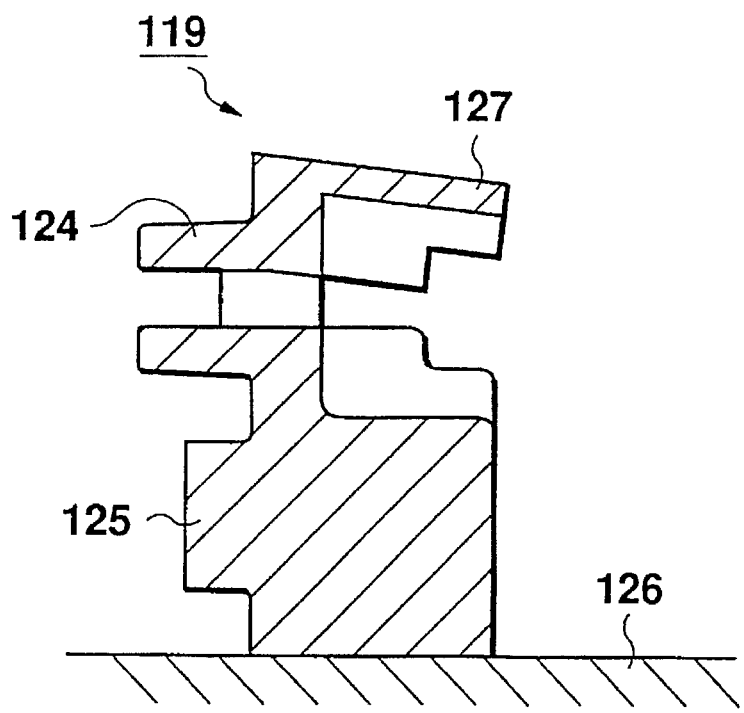
FIG. 10 is a diagram for explaining the occurrence of a strain when sintering the slider blank shown in FIG. 5, particularly showing the sintered shape which results when the slider blank is sintered while lying on its side as in FIG. 9.
Figure 11:
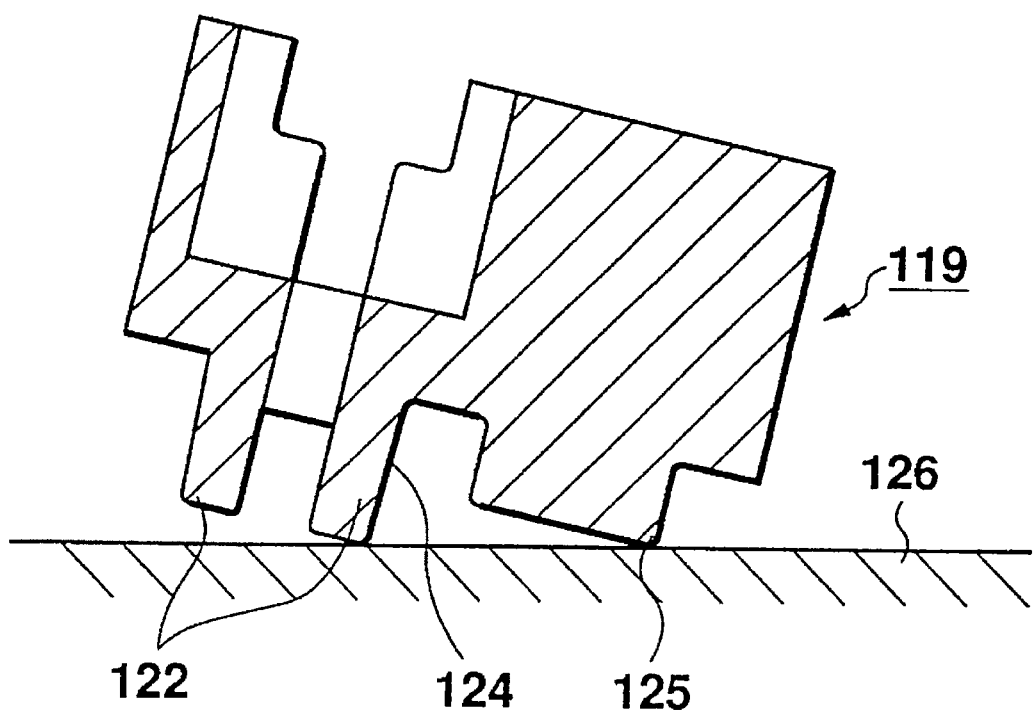
FIG. 11 is a diagram for explaining the occurrence of a strain when sintering the slider blank shown in FIG. 5, in particular, showing the case where the slider blank is inverted.
Figure 12:
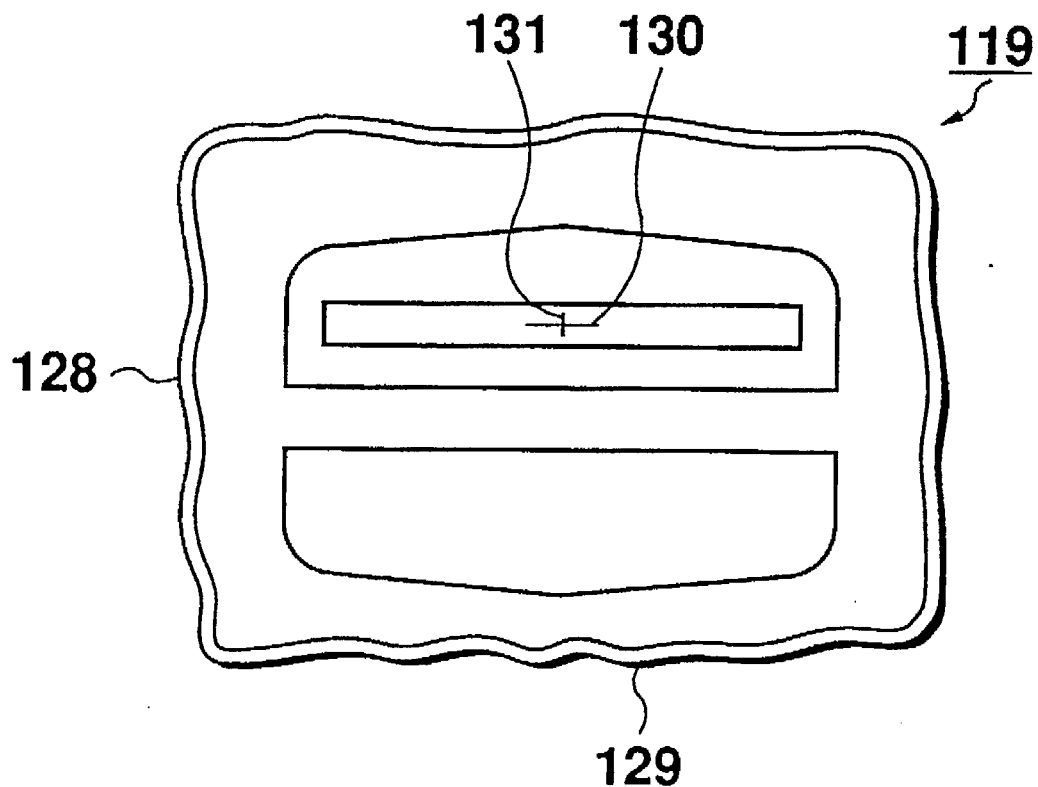
FIG. 12 is a diagram showing a strain and waviness on the lateral side after sintering the slider blank shown in FIG. 5.
Figure 13A:
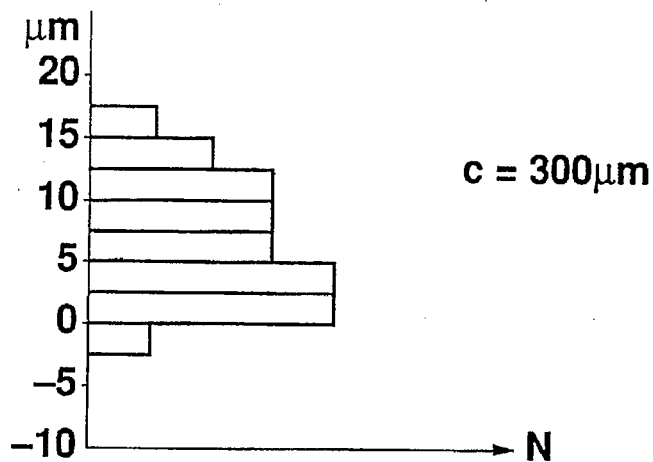
FIG. 13A is a diagram showing an influence which the amount of sealing glass exerts on the variation in CS level difference in the slider blank shown in FIG. 5.
Figure 13B:
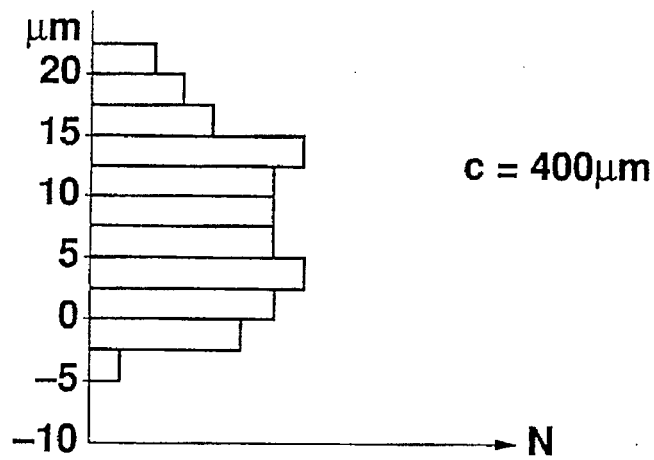
FIG. 13B is a diagram showing an influence which the amount of sealing glass exerts on the variation in CS level difference in the slider blank shown in FIG. 5.
Figure 13C:
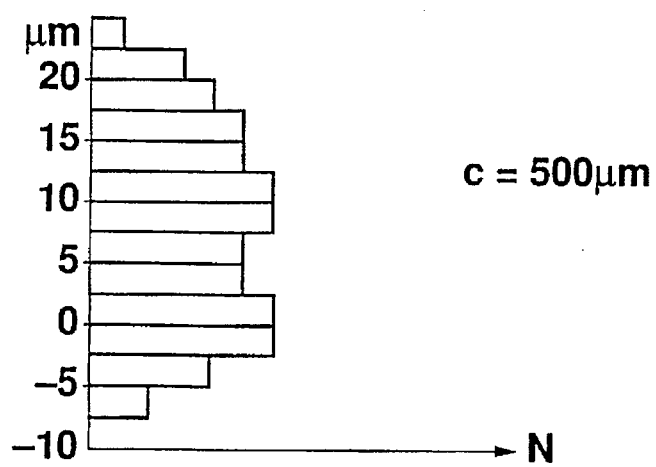
FIG. 13C is a diagram showing an influence which the amount of sealing glass exerts on the variation in CS level difference in the slider blank shown in FIG. 5.

In order to solve the above problems, an integral type slider having protrusions continuously formed along the long sides of an elongated hole as shown in FIG. 5 and described above was used to examine the influence an amount of sealing glass exerts on the variation in the CS level difference. FIGS. 13A, 13B, and 13C are graphs which together show how in this method of manufacturing a magnetic head, the CS level difference varies as the diameter c of a glass rod 121 changes. The height e of the protrusions was 200 µm. FIGS. 13A, 13B, and 13C show variation in CS level difference given the glass rod 121 diameters c of 300 µm, 400 µm, and 500 µm, respectively. Although a fairly large variation far from practical use is seen in any case, the variation has a tendency to diminish with the diameter c of the glass rod 121. Reducing the diameter c of the glass rod 121 will lower production costs, because less glass will be used and less glass will have to be removed.

The effect of the protrusion height e was then examined. FIGS. 14A to 14D are graphs depicting the variation of the CS level difference f for different protrusion heights. FIGS. 14A, 14B, 14C and 14D are for protrusion 122 heights e of 200 µm, 100 µm, 0 µm, and −100 µm, respectively. "−100 µm" means that the surface 123 of the slider 119 whereon the glass rod 121 is mounted, was ground down by 100 µm, resulting in a mounting surface substantially coincident in height with a core chip blank 120. Also seen is a tendency for the variation in CS level difference f to diminish with the height e of the protrusions 122. For FIGS. 14C and 14D, the variation in CS level difference is about +4 µm and +3 µm, respectively.

Figure 15:
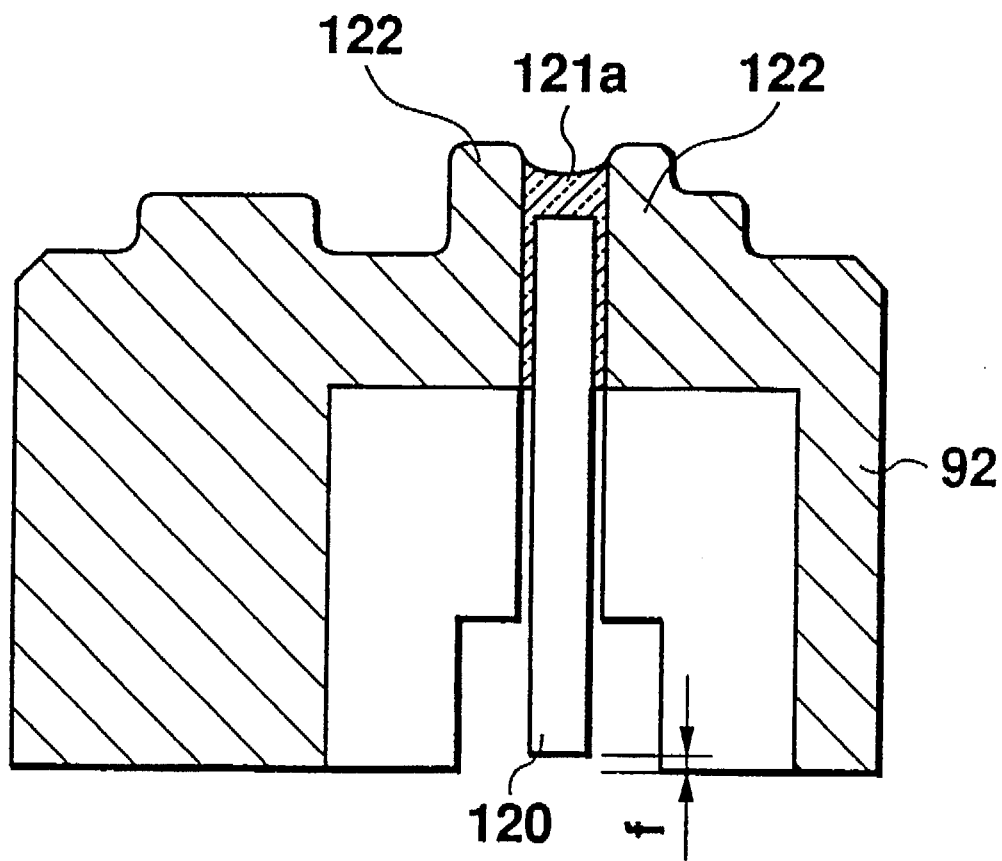
FIG. 15 is a diagram showing the status of the magnetic head core where the sealing glass has resolidified after melting.

The results of these experiments will be shown. FIG. 15 is a sectional view showing the status of the glass rod 121 of FIG. 5 after melting. The molten glass 121a which is obtained by melting the glass rod 121 with heat fills the gap between the protrusions so as to bridge the protrusions. Since the core chip blank is pulled upward by the surface tension of the molten glass 121a, the core chip blank is positionally unstable, thus resulting in a greater variation in the CS level difference.

According to the results of the experiments described above, it is necessary to abolish the protrusions and substantially equalize the height of the glass rod mounting surface with the core chip blank. However, abolishment of the protrusions may prevent the slider itself from positioning the glass rod. Therefore the protrusions should be confined to the minimum length necessary to guide the glass rod. The protrusions need only possess a height about one-half the diameter of the glass rod 121. This is enough to guide the glass rod, and does not require an excessive height. The smaller the diameter of the glass rod, the better. However, since too small an amount of glass may cause a deficient filling, the diameter can only be reduced as long as sufficient filling is ensured.

Figure 16:
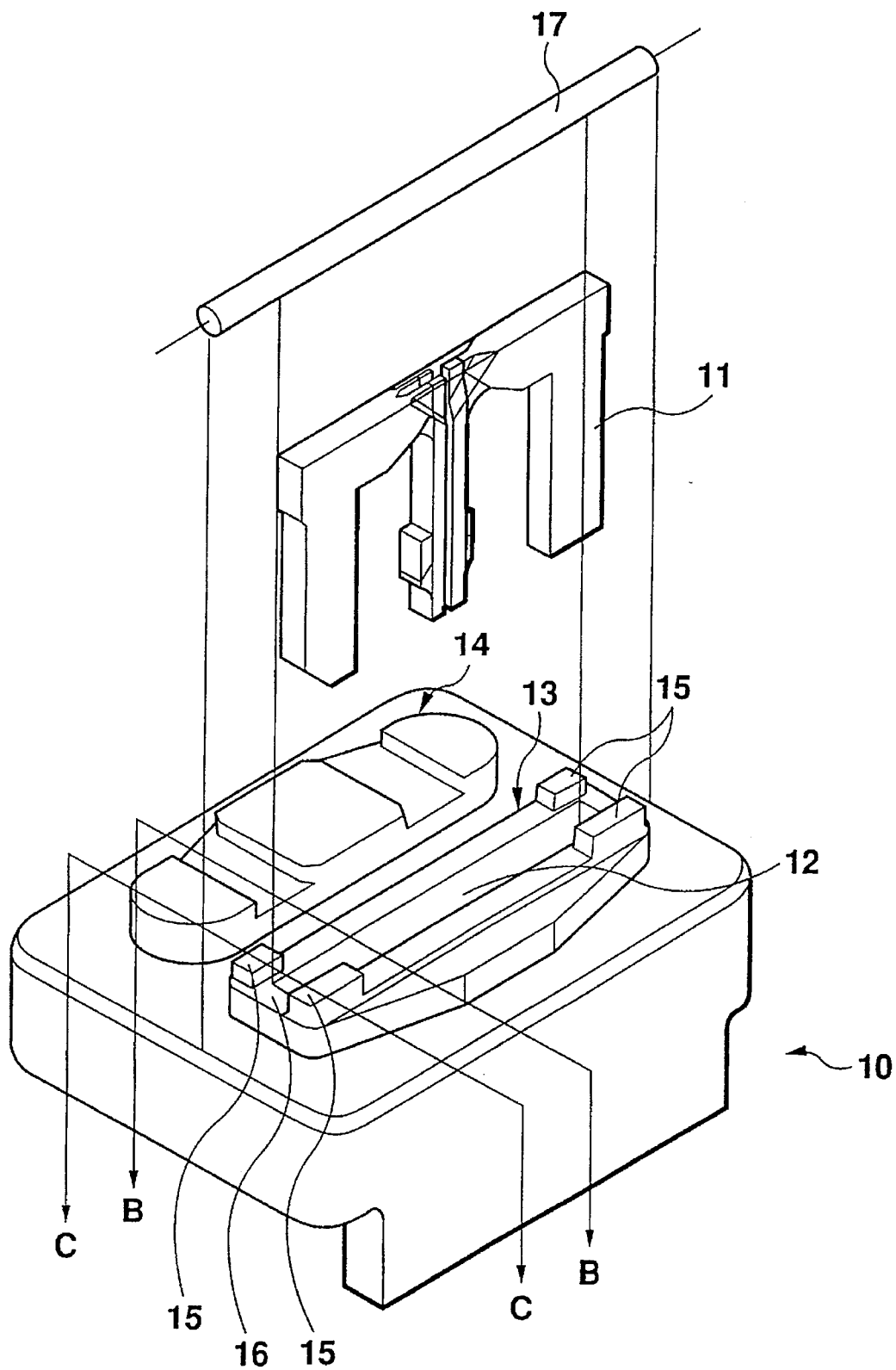
FIG. 16 is a diagram for explaining the assembly of a magnetic head core which is a preferred embodiment of the present invention.
Figure 17:
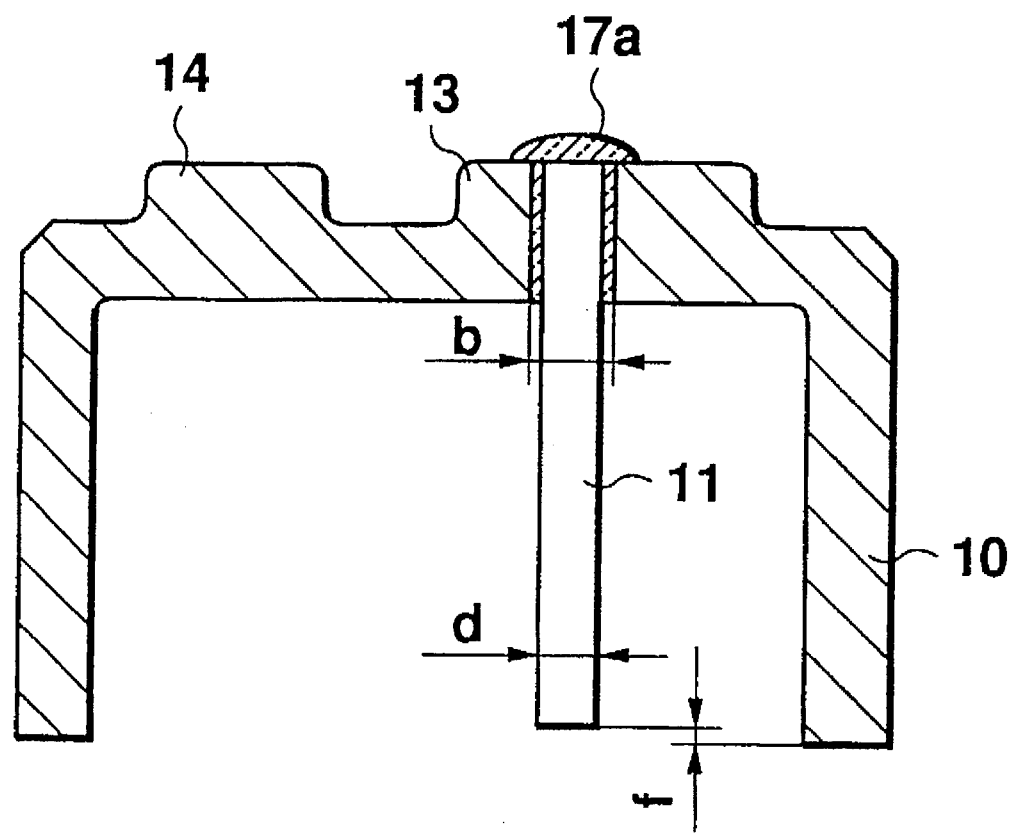
FIG. 17 is a diagram showing a section taken along the line B—B after melting the sealing glass in the magnetic head core shown in FIG. 16.
Figure 18:
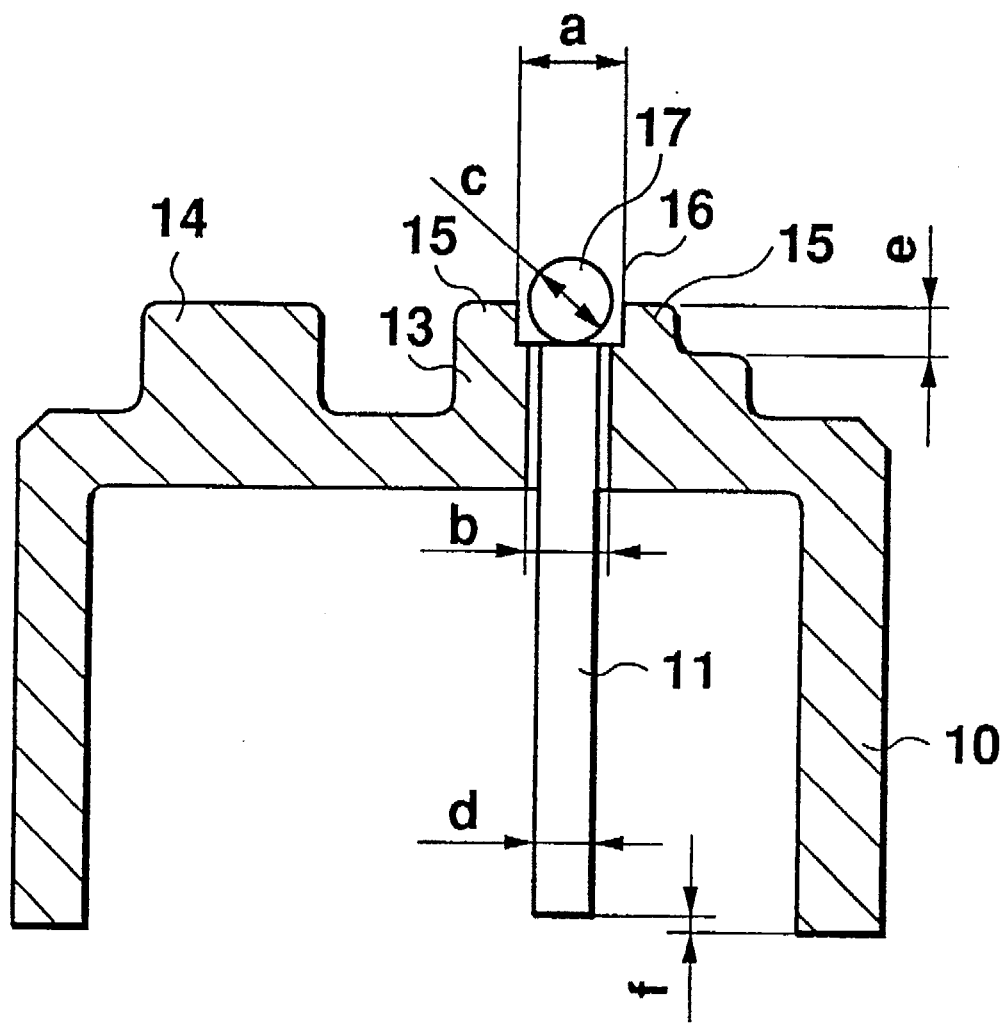
FIG. 18 is a sectional view taken along the line C—C before melting the sealing glass in the magnetic head core shown in FIG. 16.

The significance of the accompanying drawings will now be explained. FIG. 16 is a perspective view showing a method of manufacturing a magnetic head which is an embodiment of the present invention. FIG. 17 is a sectional view of the magnetic head after assembly along the line B—B shown in FIG. 16. FIG. 18 is a sectional view taken along the line C—C shown in FIG. 16, showing the premelting state.

A slider blank generally designated 10 has an elongated hole 12 for accommodating a core chip blank 11, and further has a first sliding-contact part 13 including the elongated hole 12, and a second sliding-contact part 14 juxtaposed to the first sliding-contact part 13. The first and second sliding-contact parts 13, 14 are parts whose surfaces are ground down by a predetermined amount together with the core chip blank 11 to form a sliding-contact surface in sliding contact with the floppy disk. The first sliding-contact part 13 has four protrusions 15 provided along the edges of the long sides of the elongated hole 12 and at both ends of the elongated hole 12.

Furthermore, the length of the glass rod 17 is set to be greater than the length of the elongated hole 12 but substantially equal to the length of the external dimension of the slider blank 10. This prevents the glass rod from contracting toward the center when melted and ensures that at the ends of the elongated hole 12 the gap between the core chip blank 11 and the slider blank 10 will be sufficiently filled with glass.

The process of joining the core chip blank 11 and the slider blank 10 together comprises the steps of aligning the core chip blank 11 for the insertion into the elongated holes 12 of the slider blank 10, mounting the glass rod 17 on the mounting surface between the protrusions 15, and filling the gap between the core chip blank 11 and the slider blank 10 with glass melted by heat to obtain a junction core. The protrusions 15 and the other protruding portions adjacent thereto on the slider blank 10 as well as the glass which has been squeezed out are removed by grinding, and then subjected to another grinding to obtain a smoothly finished sliding-contact surface.

FIG. 17 shows a core section without the protrusions 15. Due to the fact that the height of the mounting surface 16 of the slider blank 10 on which the glass rod 17 is mounted is substantially equal to the height of the core chip blank 11 and that the length and height of the protrusions 15 are restricted, the influence of the molten glass 17a on the core chip blank 11 through surface tension is extremely reduced so that the surface tension of the molten glass 17a does not raise the core chip blank.

A height of the protrusions 15 from the mounting surface 16 which is about one-half the thickness of the core chip blank 11 would be enough to guide the glass rod having a diameter substantially the same in dimension as the thickness of the core chip blank 11 without backlash.

The thickness of the core chip is typically on the order of 300 μm. If the thickness d of the core chip blank 11 is 300+10 μm, then the distance b between the long sides of the elongated hole 12 of the slider blank 10 is set to be 340±10 μm, and the internal distance a of the protrusions 15 is set to be 370±10 μm. In order to conveniently manufacture the mold, the distance a is slightly wider than the distance b. The term "slightly" means that a minus b is on the order of 30 μm. Preferably, this value is less than 200 μm so as to prevent any backlash between the glass rod 17 and the protrusions 15.

Although the glass rod 17 has a uniform cross section, it may possess any sectional shape. In view of production cost, however, a circular shape is preferred. From the result of the foregoing experiment showing that the variation in CS level difference diminishes with the diameter c of the glass rod 17, it follows that the diameter c can be equal to or slightly less than the internal distance a of the protrusions 15 and substantially equal to the thickness of the core chip blank 11. Such a diameter will measure between 300 and 350 μm, and in this embodiment it was set to be 320 μm. A diameter c smaller than the thickness of the core chip blank might possibly cause a deficient filling.

Discontinuous arrangement of the protrusions will decrease the amount of glass drawn into the inner surface of the protrusions by the surface tension, and hence the use of a thin glass rod having a diameter substantially equal to the thickness of the core chip blank will reduce the variance in CS level difference without causing any insufficient filling of glass. Further, the use of a thin glass rod will lower unit costs for the glass rod. Since less glass will be ground away after melting, working time will be shortened and a whetstone used to grind glass away will last longer.

Figure 14A:
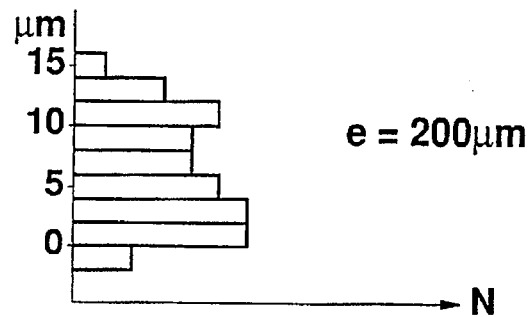
FIG. 14A ms a diagram showing an influence which the height of protrusions exerts on the variation in CS level difference in the slider blank shown in FIG. 5.
Figure 14B:
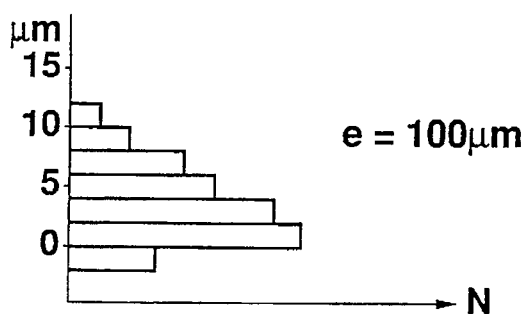
FIG. 14B is a diagram showing an influence which the height of protrusions exerts on the variation in CS level difference in the slider blank shown in FIG. 5.
Figure 14C:
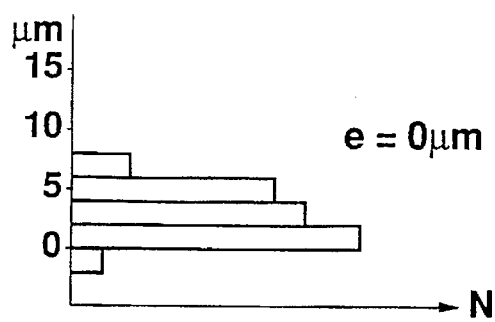
FIG. 14C is a diagram showing an influence which the height of protrusions exerts on the variation in CS level difference in the slider blank shown in FIG. 5.
Figure 14D:
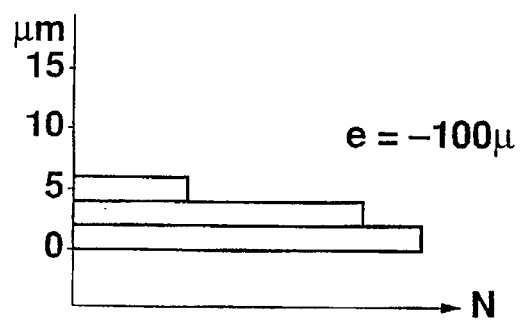
FIG. 14D is a diagram showing an influence which the height of protrusions exerts on the variation in CS level difference in the slider blank shown in FIG. 5.

As described above, the variance in CS level difference when using a method of manufacturing the present invention was examined. In this method the dimensions of individual parts were set so as to limit the points on which the protrusions for guiding the glass rod are arranged, to obtain the same result as shown in FIG. 14D. The variation of ±3 μm in the CS level difference is a value sufficient for practical use, and therefore makes unnecessary the stratified operation on groups of cores for the CS level difference f after the core chip blank 11 and the slider blank 10 are joined together.

Since the stratified operation on groups of cores is not required, neither the core chip blank nor the underside of the slider will be subjected to stresses and any resulting flaw, cutout or residual set which stratified operation on groups of cores might cause.

Further, the absence of the stratified operation of the core will ensure that the core can be processed at the next step (GD processing step) without delay, which will eliminate the necessity of keeping cores in stock, thus shortening the processing procedure. In addition, the reduced variance in the CS level difference remarkably improved the GD accuracy of the finished magnetic head. This improved GD accuracy reduced variance in the electromagnetic conversion characteristics of the magnetic head. In particular, the improved GD accuracy reduced variation in the a) regenerative output, b) overwrite, and c) resolution.

Figure 19A:
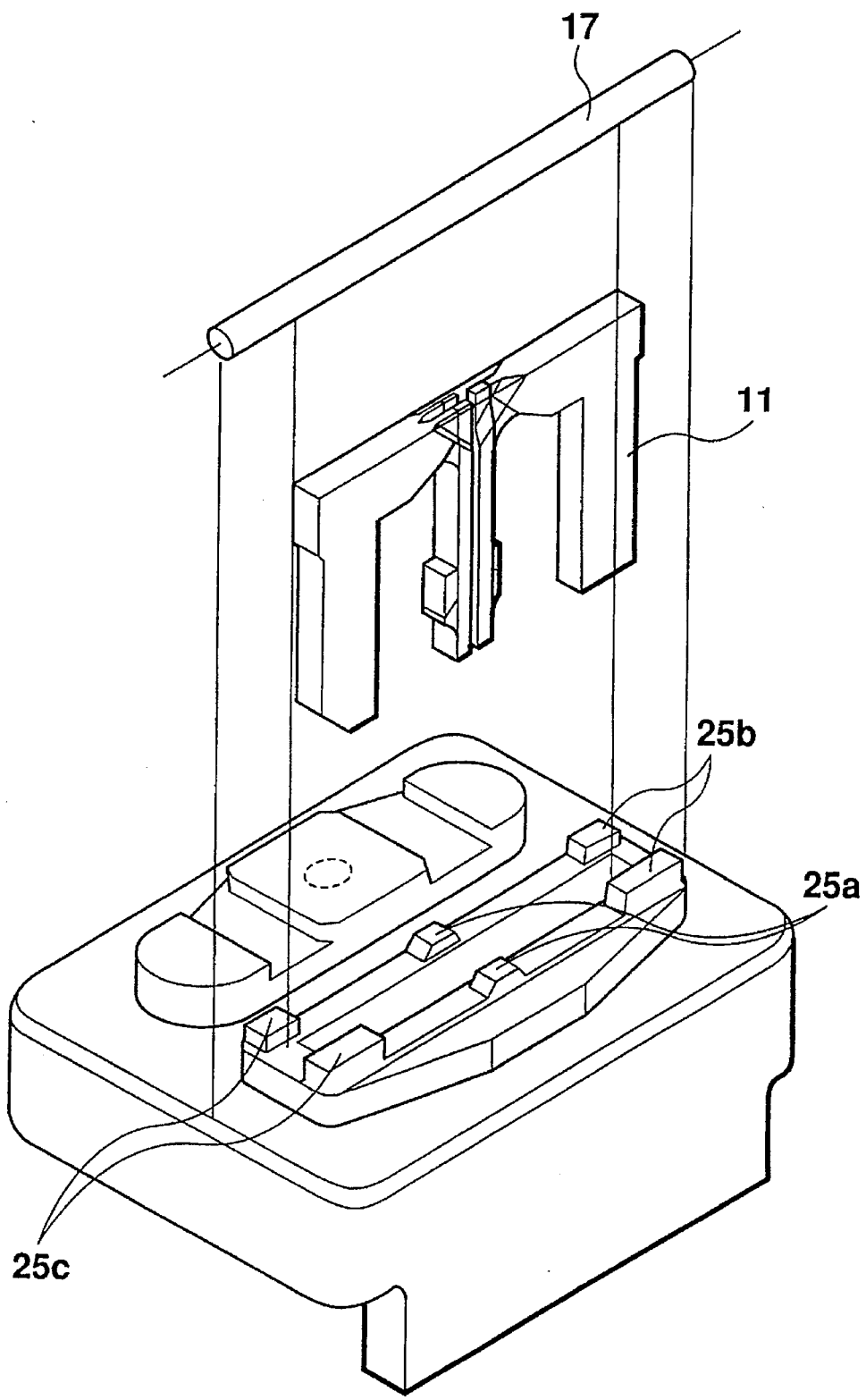
FIG. 19A is a diagram for explaining the assembly of a magnetic core which is another preferred embodiment of the present invention.

FIG. 19A depicts a further embodiment of the present invention. In FIG. 19A, the long sides of the elongated hole 22 each have three protrusions 25a, 25b, and 25c. Intermediate protrusions 25a are lower in height than protrusions 25b and 25c at both ends of the elongated hole by about 50 to 100 μm in height since the protrusions guide the glass rod 17, at least one side of the elongated hole must have two or more protrusions. However, if protrusions are provided on both sides, then one side need only possess at least one protrusion and the other side need only possess two or more protrusions. In other words, the embodiment is characterized by the fact that the protrusions are discontinuously arranged on at least one side along the long sides of the elongated hole.

In the assembly step shown in FIG. 19A, the glass is drawn to the central protruding portion by the surface tension. This surface tension moves glass into the central portion that has more space to fill, which far reduces the frequency of occurrence of deficient filling. This is particularly effective in the slider having an elongated hole with relatively long longitudinal dimensions.

Figure 19B:
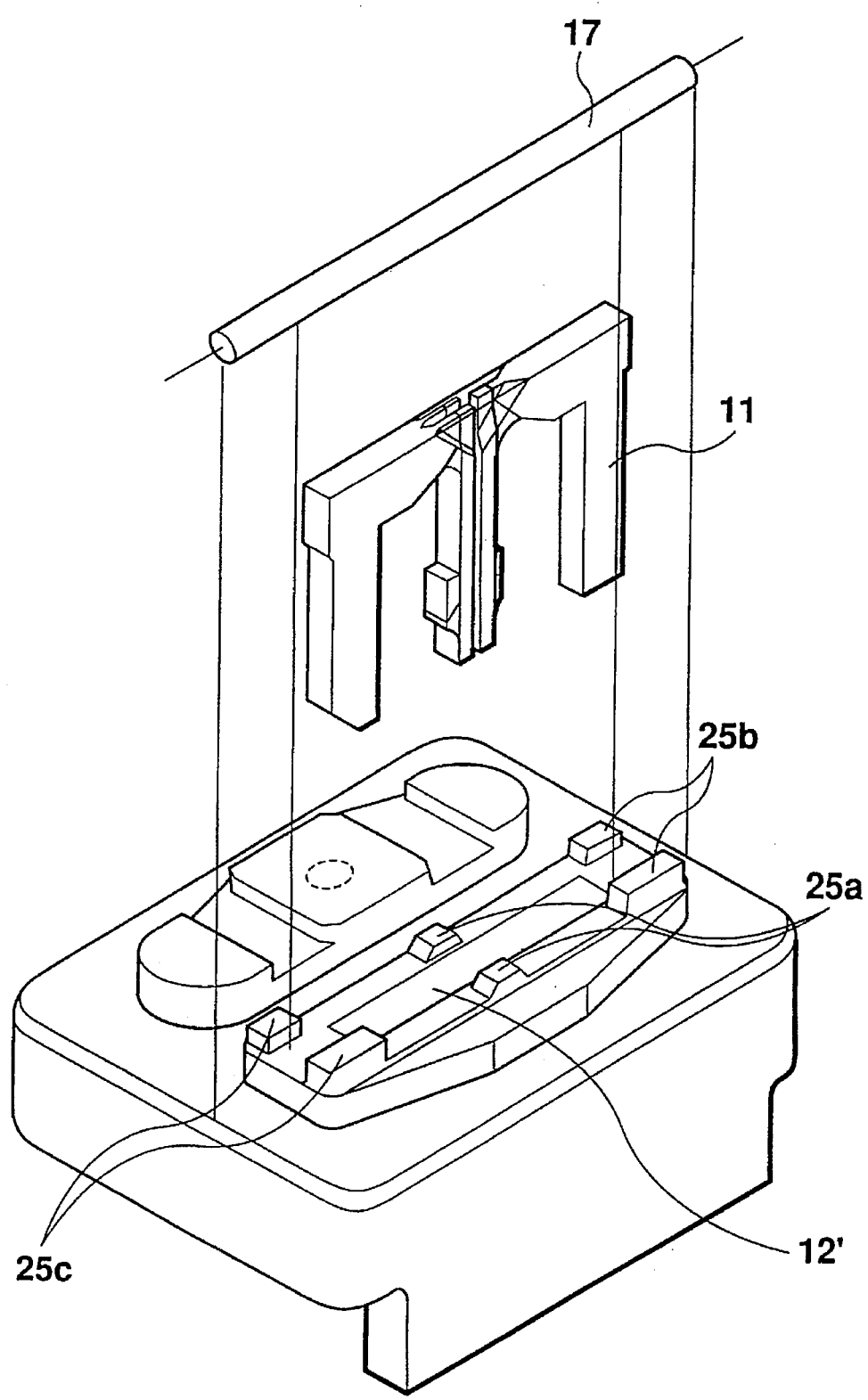
FIG. 19B is a diagram for explaining the assembly of the magnetic core which is yet another preferred embodiment of the present invention.

Another embodiment is shown in FIG. 19B, where the protrusions 25b, 25c are located at a distance away from both edges of the elongated hole 12'. This arrangement prevents the surface tension of melted glass between the protrusions from adversely affecting the core chip blank 11, thereby reducing the variations in CS level difference.

Figure 20:
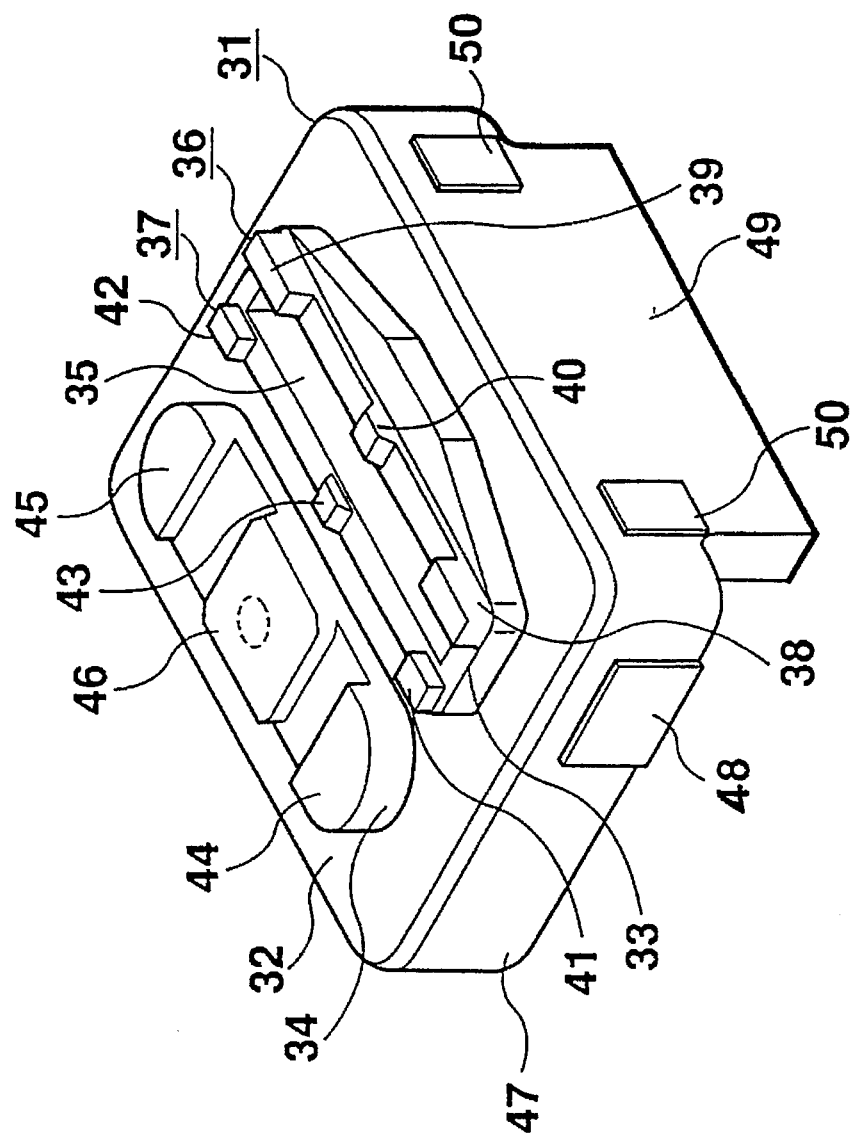
FIG. 20 is a perspective view of a slider blank which is a further preferred embodiment of the present invention.
Figure 21:
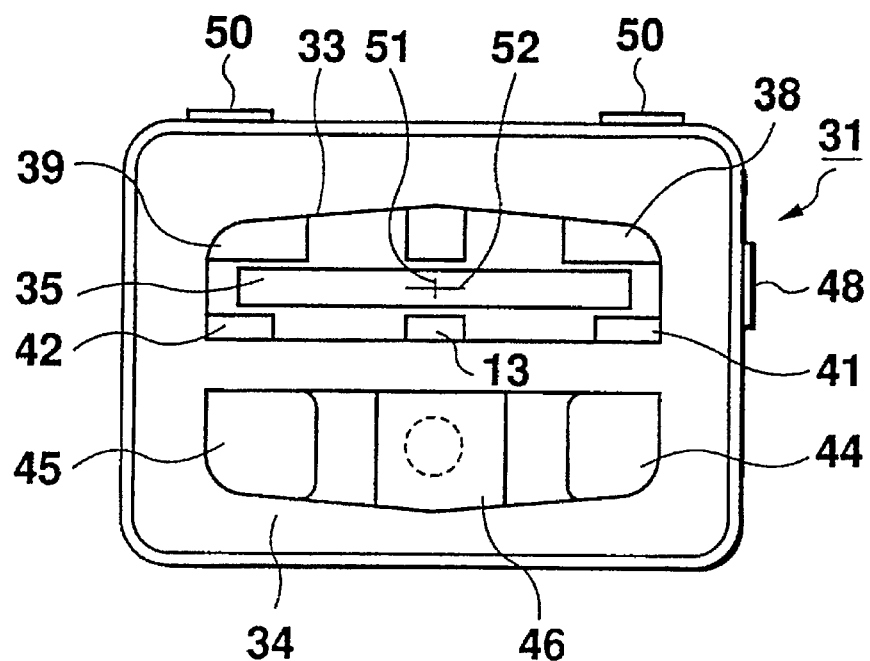
FIG. 21 is a top plan view of the slider blank shown in FIG. 20.

FIGS. 20 and 21 depict yet another embodiment in accordance with the present invention. FIG. 20 is a perspective view of a slider blank for use in a combined magnetic head, and FIG. 21 is a top plan view of the blank.

The slider blank is a substantially box-like blank 31 that accommodates a core chip and coil assembly. This blank 31 has on its sliding-contact surface a main sliding-contact portion 33 and a subsidiary sliding-contact portion 34 which protrude from a relieved reference surface 32. The sliding-contact portions 33 and 34 each have an elongated semicircular shape whose outer side is curved. The main sliding-contact portion 33 has at its central portion an elongated hole formed in the slider blank 31, and glass guide portions 36 and 37 are formed on both sides of the elongated hole 35. The outside glass guide portion 36 includes protrusions 38 and 39 located at both its ends and a protrusion 40 located intermediately near its center. The protrusions 38, 39 and 40 have flat end surfaces. The protrusions 38 and 39 at both ends have the same height, but the height of the intermediate protrusion 40 is less than that of the protrusions 38 and 39. The inside glass guide portion 37 includes protrusions 41 and 42 located at both ends, and a protrusion 43 located intermediately near its center. The protrusions 41, 42 and 43 have the same height, which is less than the height of the protrusions 38 and 39 located at both ends of the outside glass guide portion 36.

The subsidiary sliding-contact portion 34 has at both its ends protrusions 44 and 45 and intermediately near its center a protrusion 46. The protrusions 44, 45 and 46 have flat end surfaces. The protrusions 44 and 45 at both ends have the same height. The height of the intermediately located protrusion 46 is less than that of the protrusions 44 and 45. In addition, the protrusions 44 and 45 have the same height as that of the protrusions 38 and 39 at both ends of the outside glass guide portion 36.

The blank 31 has along its outer periphery a pair of end wall 47 located at its shorter sides and a pair of lateral walls 49 located at its longer sides. The lateral wall 49 includes assembly reference surfaces 50, 50 separated from each other.

Figure 22:
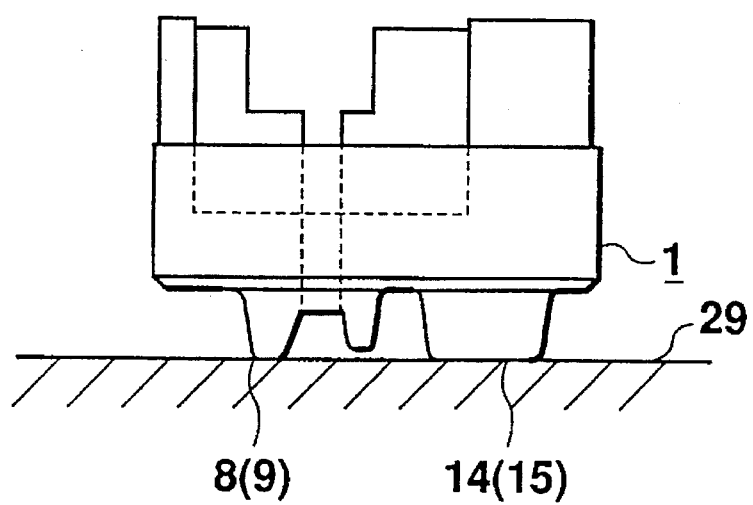
FIG. 22 is a diagram showing the position during sintering of the slider blank shown in FIG. 20.

Since the protrusions 38 and 39 at both ends of the main sliding-contact portion 33 of the blank 31 and the protrusions 44 and 45 at both ends of the subsidiary sliding-contact portion 34 have the same height and lie in the same plane, the protrusions 38, 39, 44 and 45 serve as contact surfaces as shown in FIG. 22. These contact surfaces stabilize the erect posture of the blank 31 during sintering so that the shrinkage is restricted by the frictional resistance between the contact surfaces and a sintering jig 29 and the blank 31 does not become a trapezoid. Also, since the distance between the contact surfaces is small, the transformation can be minimized.

In this manner, because the transformation of the blank 31 during sintering can be minimized, the shape of the blank 31 is stabilized. Therefore, even though the assembly reference surfaces 48 formed on the end walls 47 on the shorter sides and the assembly reference surfaces 50 formed on the lateral walls 49 on the longer sides become wavy due to a partially non-uniform shrinkage factor, the time required for seeking the most convex portion at the time of measurement is reduced since the assembly reference surfaces 48 and 50 each have a small section. By employing these assembly reference surfaces 48, 50 as a reference, the position of the recording/reproduction gap 51 on the peripheral reference and the position of the azimuth and recording/reproduction track center 52 can be correctly found when assembling the core chip.

Figure 23A:
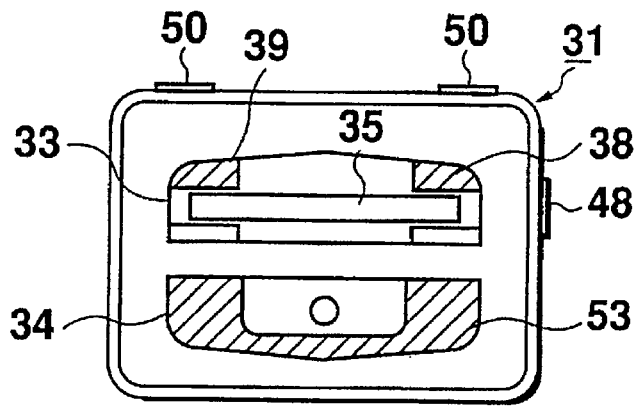
FIG. 23A is a diagram showing the location on the slider blank of the protrusion having the largest height.
Figure 23B:
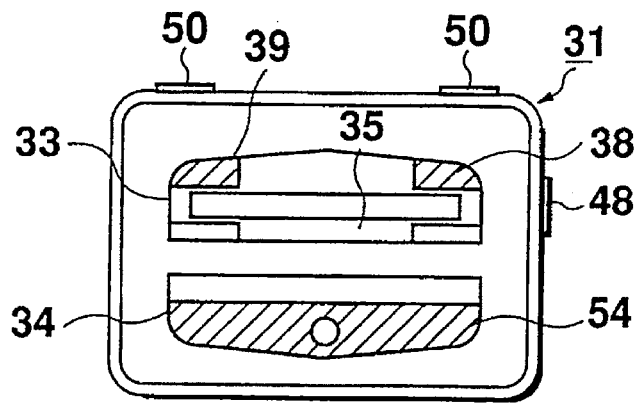
FIG. 23B is a diagram showing the location on the slider blank of the protrusion having the largest height.
Figure 23C:
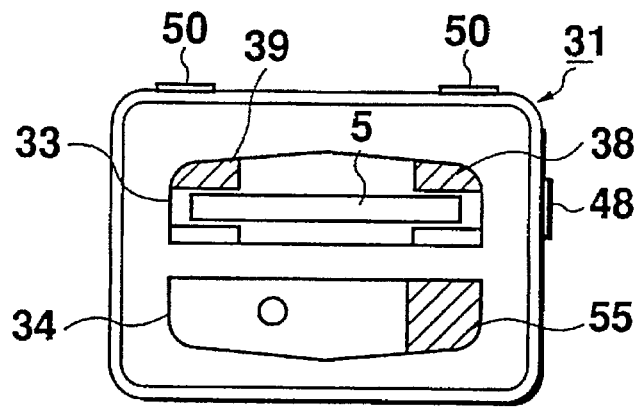
FIG. 23C is a diagram showing the location on the slider blank of the protrusion having the largest height.
Figure 24:
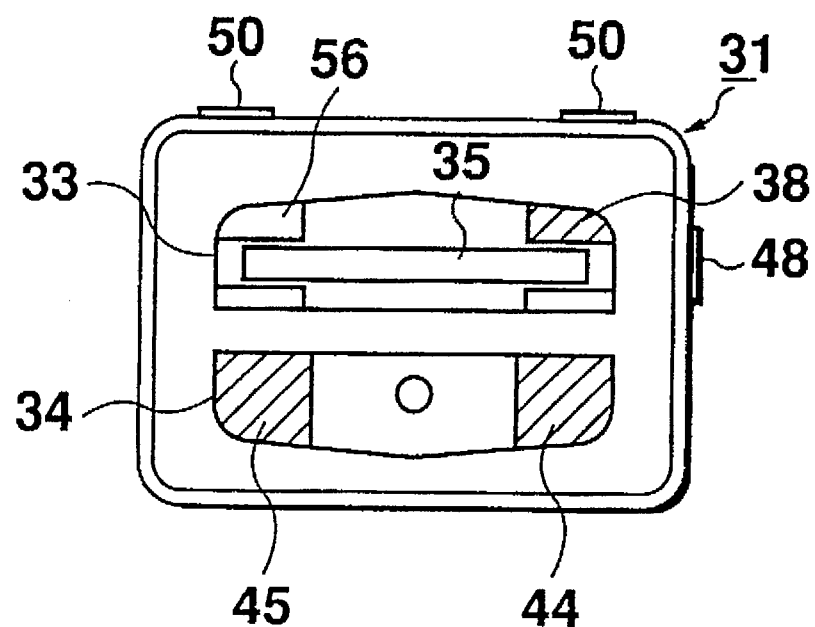
FIG. 24 is a diagram showing the location on the slider blank of the protrusion having the largest height.

The protrusions 38, 39 on both ends of the main sliding-contact portion 33 and the protrusions 44, 45 on both ends of the subsidiary sliding-contact portion 45 have the same height and lie within the same plane in order to stabilize the posture of the blank 31 during sintering. The posture of the blank 31 can alternatively be stabilized during sintering by at least three protrusions having the same height, whose location is not limited to either the main sliding-contact portion 33 or the subsidiary sliding-contact portion 34 of the blank 31. Accordingly, one protrusion 53, 54, 55 may be provided on the subsidiary sliding-contact portion 34 as shown in FIGS. 23A, 23B and 23C in such a manner that the protrusion 53, 54, 55 has the same height as that of the protrusions 38, 39 at both ends of the main sliding-contact 33 and lies within the same plane. Also, as shown in FIG. 24, the height of the protrusions 39 of the main sliding-contact portion 33 may be lowered to obtain a protrusion 56.

The assembly reference surfaces 48, 50 may be located at positions opposed to those shown in FIGS. 21, 23A, 23B, 23C and 24. The assembly reference surfaces are preferably located at a position where they are minimally deformed when the slider is sintered.

Figure 26:
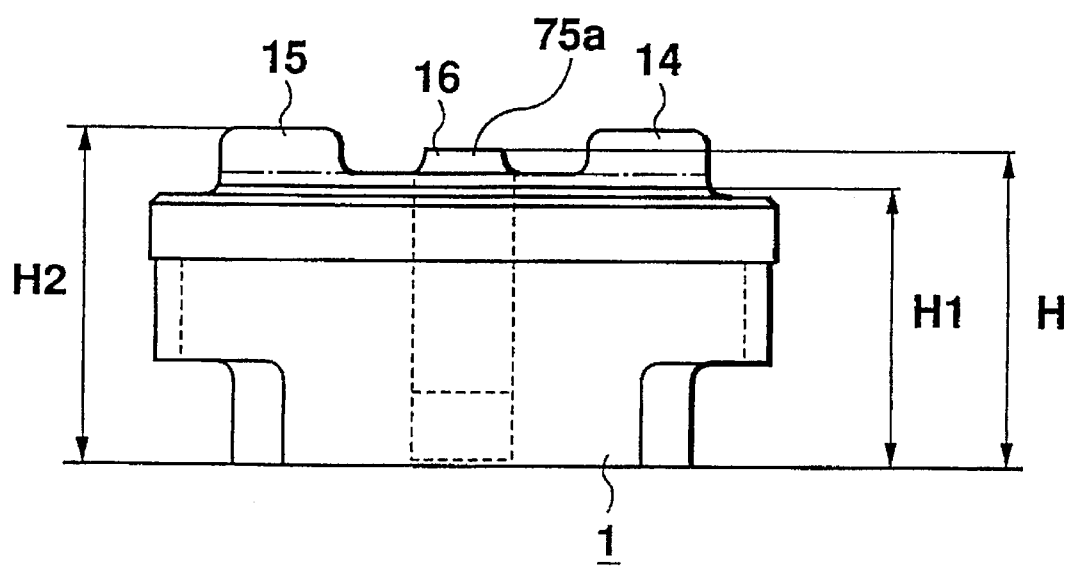
FIG. 26 is a diagram for explaining a relationship between the dimensions of the mold shown in FIG. 25 and the dimensions of a molded slider blank.
Figure 25:
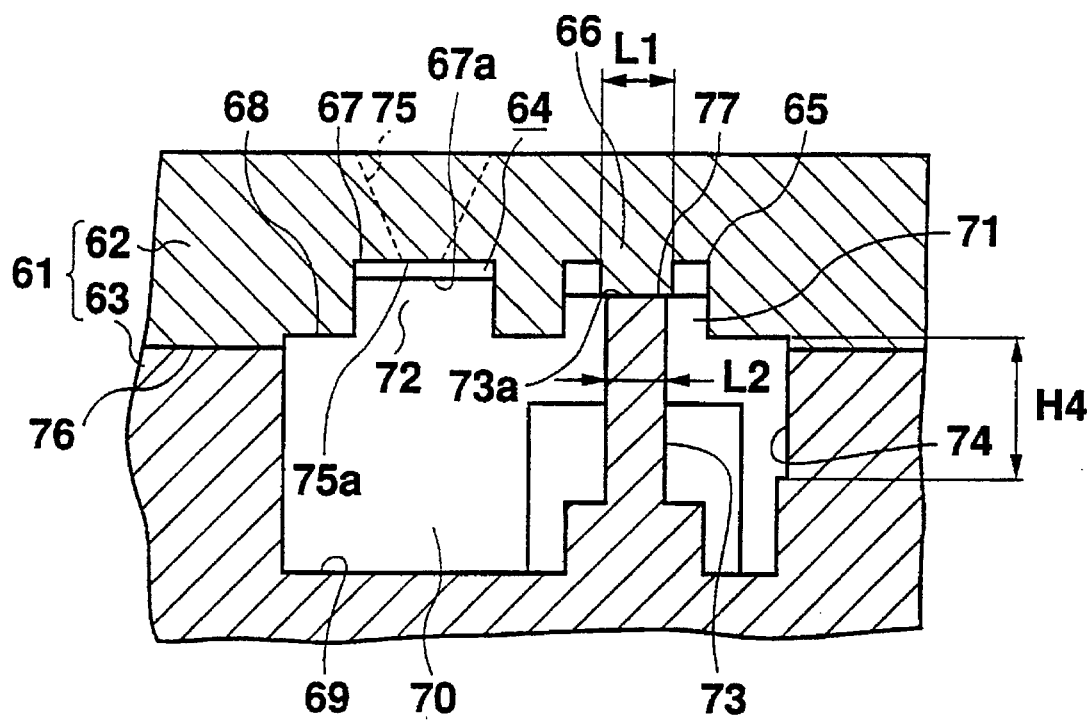
FIG. 25 is a diagram showing a mold for molding the slider blank shown in FIG. 20.

FIG. 25 depicts a mold 61 having a mold structure for molding the above-described blank 31. This mold includes a stationary mold 62 and a movable mold 63 the molding section 64 of the stationary mold 62 includes a protrusion molding part 65 for molding the protrusions 38, 39, 40 of the main sliding-contact portion 33, a surface portion molding part 66 for molding the area between the inside and the outside glass guide portions 36 and 37, a subsidiary sliding-contact surface molding part 67 for molding the subsidiary sliding-contact portion 34, and a relief reference surface molding part for molding the relief reference surface 32. A protrusion molding point 67a in the intermediate portion of the subsidiary sliding-contact surface molding part 67 includes a pin point gate 75. As shown in FIG. 26, the magnitude of the height H of the tip of the pin point gate 75 is between the height H1 of the sliding-contact surface of the finished blank 31 and the largest H2 of the heights of the protrusions of the blank 31.

The movable mold 63 includes a mold section 69. This mold section 69 includes an external shape molding part 70 for molding a box-like external shape of the blank 31, a molding part 71 for molding the region except the protrusions 38, 39 40 of the main sliding-contact portion 33. The mold section 69 also includes a molding part 72 for molding the region except the protrusions 44, 45, 46 of the subsidiary sliding-contact portion 34, and an elongated hole molding part 73 for molding the elongated hole 35. The molding surface of the end walls 47 on the shorter sides of the external shape molding part 70 includes a molding portion (not shown) for the assembly reference surface 48. The molding surface on the lateral walls 49 on the longer sides of the external shape molding part 70 includes a molding portion 74 for the assembly reference surface 50.

A mold butt surface of the mold 61 is butted at a mating surface between the stationary mold 62 and the movable mold 63, and at a mating surface between the surface portion molding part 66 of the stationary mold 62 and the foremost end surface 73a of the elongated hole molding part 73 of the movable mold 63. The width L1 of the surface portion molding part 66 of the stationary mold 62 is larger than the width L2 of the elongated hole molding part 73, that is L1 minus L2 equals between 0.02 to 0.1 mm. The lower limit 0.02 mm of this value is greater than or equal to the dimension of the displacement between the stationary mold 62 and the movable mold 63.

Figure 27:
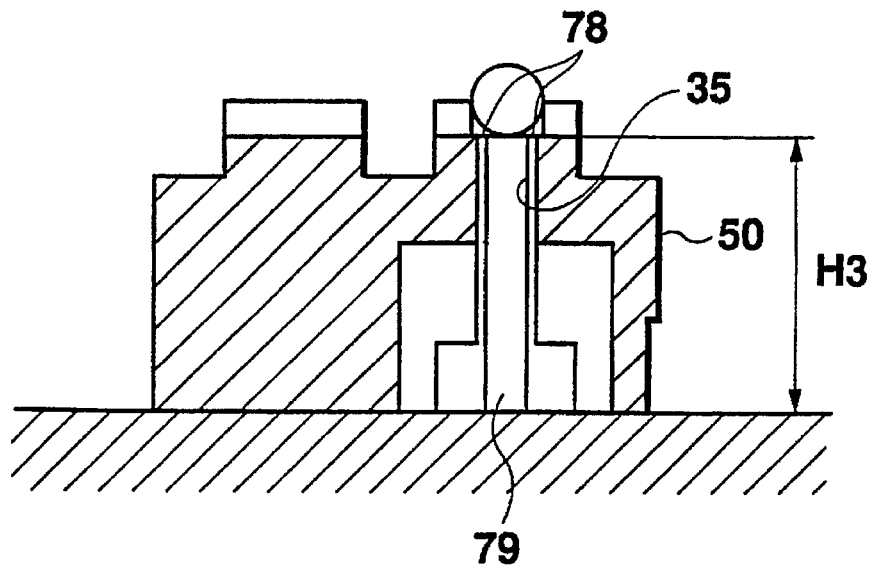
FIG. 27 is a diagram for explaining the relationship between the dimensions of the mold shown in FIG. 25 and the dimensions of the molded slider blank.
Figure 28:
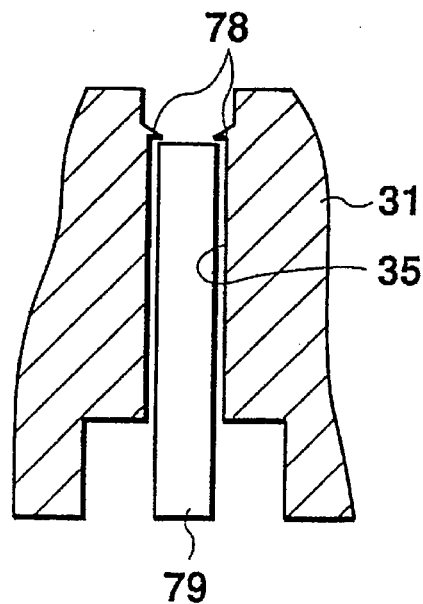
FIG. 28 is a diagram showing a burr which may appear on the mold mating surface.
Figure 29:
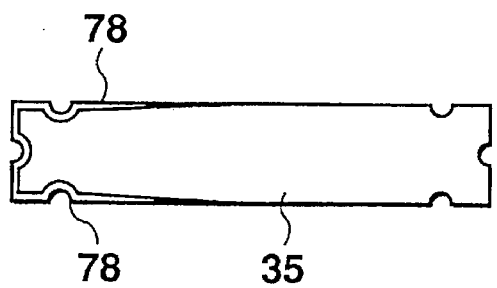
FIG. 29 is a diagram showing a burr which may appear on the mold mating surface.
Figure 30:
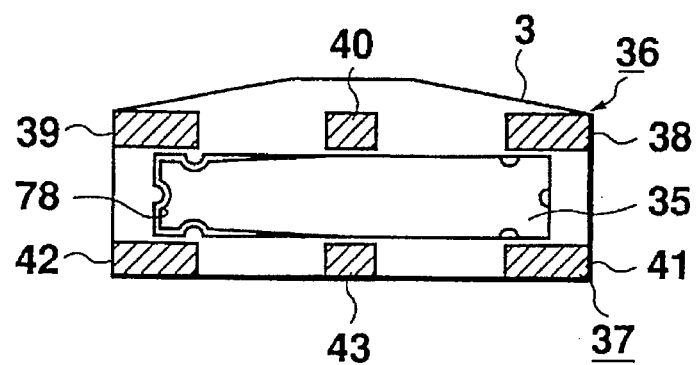
FIG. 30 is a diagram showing a burr which may appear on the mold mating surface.

Since the mold butt surface of the mold 61 is located on the upper end surface of 73a of the elongated hole molding part 73 of the mold 61 in the above embodiment of the mold structure, after injection molding the blank 31 may present a burr 78 projecting from the side of the ends of the elongated hole 35 as shown in FIGS. 27, 28, and 29. The height H3 of the burr 78 is set to be the same as or slightly larger than that of the core chip 79, thereby facilitating the removal of the burr 78. Even if a small amount of burr is left, the core chip 79 passes through the burr 78 without being caught by the burr 78, thus preventing an extensive dispersion in the CS level difference. Further, a clear view of the burr 78 located on the upper portion as shown in FIG. 29 will enable the burr to be removed by a barrel or the like and eliminate the necessity of manually and individually removing the burr 78. Moreover, since the glass guide portions 36, 37 are substantially divided into six portions by the protrusions 38, 39, 40, 41, 42 and 43 the burr 78 can be clearly viewed from the outside, thus allowing the burr to be removed by the barrel.

Unfortunately, the mold is gradually abraded with use and its corners may be dulled. As the mold wears, the burr 78 appears increasingly on the surface. Because the burr 78 is easy to see and indicates wear in the mold, it facilitates discovery of wear in the mold and allows the mold to be promptly maintained.

The mold butt surface located on the upper end surface 73a of the elongated hole molding part 73 will allow a larger height H4 of the molding surface on the end walls 47 and the lateral walls 49 of the external shape molding part 70 of the molding section 69 of the movable mold 63. Furthermore, the pin point gate 75 located on the subsidiary sliding-contact surface molding part 67 will allow a wider molding part 74 for the reference surface 60 to be formed on the molding surface for the end walls 47 and lateral walls 49, thus ensuring that a wider assembly reference surface will be molded.

Also, the mold butt surface located on the upper end surface 73a of the elongated hole molding part 73 will facilitate the processing of the stationary mold 62 and movable mold 63. Since the pin point gate 75 is formed on the subsidiary sliding-contact molding part 67 of the mold body 61, and the height H of the foremost end of the pin point gate 75 is between the height Hi of the subsidiary sliding-contact surface at the time the slider is completed and the height H2 of the protrusions 44, 45 formed on the subsidiary sliding-contact surface portion 34, a convex vestige which remains after separating the pin point gate 75 would not reach the height of the protrusions 44, 45, nor would a concavity interfere with the finished sliding-contact surface.

In other words, the convex vestige, if it remains, will not impede the operation at its horizontal position. Also, no concave vestige is left on the finished sliding surface, thereby preventing the sliding-contact surface from collapsing to damage the recording medium.

Furthermore, by setting the height H of the pin point gate 75 closer to H2 rather than midway between the height H1 and the height H2, the case where the concave flaw remains after completion of processing can be prevented. The convex remainder, even if it occurs, will come off when the slider blank in the inverted state is sintered or when the sliding-contact surfaces are ground.

What is claimed is:

1. A slider blank comprising:

a main sliding-contact portion including an elongated hole defined by two elongated edges each having an upper surface and a plurality of protrusions discontinuously arranged on at least one of the two elongated edges.

2. The slider blank according to claim 1, wherein each of the upper surfaces of the two elongated edges include end portions and the protrusions are provided on the end portions.

3. The slider blank according to claim 1, wherein each of the upper surfaces of the two elongated edges include end portions and a middle portion and the protrusions are provided on the end portions and the middle portion.

4. The slider blank according to claim 1, wherein at least one of the protrusions has a height larger than that of the remaining protrusions.

5. The slider blank according to claim 1, further comprising a subsidiary sliding-contact portion juxtaposed with the main sliding-contact portion, wherein the subsidiary sliding-contact portion is provided with at least one protrusion.

6. The slider blank according to claim 5, wherein at least one of the protrusions of the main sliding-contact portion has a height larger than that of the remaining protrusions of the main sliding-contact portion and the at least one protrusion of the subsidiary sliding-contact portion has a height equal to that of the higher protrusion of the main sliding-contact portion.

7. The slider blank according to claim 1, further comprising a surface including the elongated hole and side surfaces intersecting the surface including the elongated hole, wherein the side surfaces includes a first side surface provided with two assembly reference surfaces and a second side surface provided with one assembly reference surface.

8. The slider blank according to claim 7, wherein the side surface having two assembly reference surfaces is positioned in the same direction as the elongated edges of the elongated hole.

9. A magnetic head comprising:

a core chip blank inserted into the elongated hole of the slider blank according to claim 1.

10. The magnetic head according to claim 9, wherein the core chip blank has a thickness and the protrusions on the slider blank have a height about one-half the thickness of the core chip blank.

* * * * *